US012652264B2

(12) United States Patent
Guedes et al.

(10) Patent No.: US 12,652,264 B2
(45) Date of Patent: Jun. 9, 2026

(54) SYSTEMS AND METHODS FOR DIGITALLY UNBOXING INTERNET SERVICES

(71) Applicant: NAMECHEAP, INC., Phoenix, AZ (US)

(72) Inventors: João Henrique Martins Ferreira Guedes, Maia (PT); Richard Kirkendall, Los Angeles, CA (US); Mohan Muthukumar Vettaikaran, Spring Hill, FL (US); Rui Rodrigo Cabral Pacheco De Melo, Maia (PT); Artem Zakharchenko, Vila Nova de Gaia (PT); Denys Mudrichenko, Kharkov (UA); Joana Manuel Fachana Cardoso Moreira Da Costa, Vila Nova de Gaia (PT); Carlos Eduardo Cravo Pereira, Mamarrosa (PT); Sara Rita Azevedo Sampaio, Oporto (PT); João Daniel Santiago Maio, Aveiro (PT); Pedro Miguel Santos Lima, Vila Nova de Gaia (PT)

(73) Assignee: NAMECHEAP, INC., Phoenix, AZ (US)

( * ) Notice: Subject to any disclaimer, the term of this patent is extended or adjusted under 35 U.S.C. 154(b) by 264 days.

(21) Appl. No.: 18/389,692

(22) Filed: Dec. 19, 2023

(65) Prior Publication Data

US 2024/0121210 A1      Apr. 11, 2024

Related U.S. Application Data

(63) Continuation-in-part of application No. 18/540,742, filed on Dec. 14, 2023, now Pat. No. 12,323,383, and (Continued)

(51) Int. Cl.
H04L 61/2521 (2022.01)
H04L 61/103 (2022.01)
(Continued)

(52) U.S. Cl.
CPC ........ H04L 61/2535 (2013.01); H04L 61/103 (2013.01); H04L 61/4511 (2022.05);
(Continued)

(58) Field of Classification Search
CPC .............. H04L 61/2535; H04L 61/103; H04L 61/4511; H04L 61/4541; H04L 61/5061;
(Continued)

(56) References Cited

U.S. PATENT DOCUMENTS 8,683,043 B1    3/2014   Peters et al.
9,391,949 B1    7/2016   Richardson et al.
(Continued)

FOREIGN PATENT DOCUMENTS

WO      2009047784 A2    4/2009

OTHER PUBLICATIONS

U.S. Appl. No. 16/823,267—Notice of Allowance dated Oct. 16, 2020, 9 pages.
(Continued)

*Primary Examiner* — Cheikh T Ndiaye
(74) *Attorney, Agent, or Firm* — Haynes Beffel & Wolfeld LLP; Andrew L. Dunlap; Paul A. Durdik

(57) ABSTRACT

The technology disclosed relates to systems and methods for digitally unpackaging one or more hosted Internet service products from a set of available hosted Internet service products. The method includes receiving a selection of a starting point and determining whether the selected starting point is one selected from (i) a domain and (ii) a hosted Internet service product. If the starting points is domain, then the method includes prompting for and receiving a (Continued)

selection of at least one hosted Internet service product category in a plurality of hosted Internet service product categories. If the starting point is a hosted Internet service product then the method includes for the hosted Internet service product, prompting for and receiving at least one domain to connect to the hosted Internet service product. The method includes setting up connections between hosted Internet service products selected and configuring the hosted Internet service products selected.

20 Claims, 27 Drawing Sheets

Related U.S. Application Data a continuation-in-part of application No. 18/525,547, filed on Nov. 30, 2023, now Pat. No. 12,267,292, which is a continuation of application No. 17/875, 824, filed on Jul. 28, 2022, now Pat. No. 11,838,260, said application No. 18/540,742 is a continuation of application No. 17/872,891, filed on Jul. 25, 2022, now Pat. No. 11,848,908, which is a continuation of application No. 17/344,832, filed on Jun. 10, 2021, now Pat. No. 11,399,008, said application No. 17/875,824 is a continuation of application No. 17/344,824, filed on Jun. 10, 2021, now Pat. No. 11,438,304, said application No. 17/344,832 is a continuation of application No. 16/823,267, filed on Mar. 18, 2020, now Pat. No. 11,038,840, said application No. 17/344,824 is a continuation of application No. 16/823,265, filed on Mar. 18, 2020, now Pat. No. 11,038,839.

(51) Int. Cl.

| | |
|---|---|
| *H04L 61/4511* | (2022.01) |
| *H04L 61/4541* | (2022.01) |
| *H04L 61/5061* | (2022.01) |
| *H04L 101/00* | (2022.01) |
| *H04L 101/686* | (2022.01) |

(52) U.S. Cl.
CPC ...... *H04L 61/4541* (2022.05); *H04L 61/5061* (2022.05); *H04L 2101/00* (2022.05); *H04L 2101/686* (2022.05)

(58) Field of Classification Search
CPC ........... H04L 2101/00; H04L 2101/686; H04L 41/0873; G06F 8/61
See application file for complete search history.

(56) References Cited

U.S. PATENT DOCUMENTS

| | | | | |
|---|---|---|---|---|
| 9,813,303 | B1 | 11/2017 | Guigli | |
| 2008/0235778 | A1 | 9/2008 | Fratti et al. | |
| 2010/0070569 | A1* | 3/2010 | Turakhia | H04L 61/4511 |
| | | | | 709/203 |
| 2011/0044184 | A1 | 2/2011 | Balasaygun et al. | |
| 2012/0324113 | A1* | 12/2012 | Prince | H04L 61/4511 |
| | | | | 709/226 |
| 2013/0326599 | A1 | 12/2013 | Bray et al. | |
| 2014/0181312 | A1 | 6/2014 | Rutten et al. | |
| 2015/0067114 | A1 | 3/2015 | Ruggeri | |
| 2016/0182441 | A1* | 6/2016 | Gupta | H04L 61/3025 |
| | | | | 709/245 |
| 2016/0294768 | A1 | 10/2016 | Khan | |
| 2017/0093793 | A1* | 3/2017 | Waldron | H04L 61/3005 |
| 2017/0195285 | A1* | 7/2017 | Kakhki | H04L 61/3025 |

OTHER PUBLICATIONS

U.S. Appl. No. 16/823,265—Notice of Allowance dated Oct. 28, 2020, 9 pages.
GITHUB—Domain-Connect-2.1, v 2.1, revision 57, Mar. 7, 2019, 43pages, [retrieved on Jan. 8, 2021]. Retrieved from the Internet <URL: https://github.com/Domain- Connect/spec/blob/ 83363c4b4a700d6dae55cdd32bf8d8fd953d79aa/Domain%20Connect% 20Spec%20Draft.adoc>.
U.S. Appl. No. 16/823,265—Notice of Allowance dated Feb. 19, 2021, 11 pages.
U.S. Appl. No. 16/823,267—Notice of Allowance dated Feb. 19, 2021, 12 pages.
PCT/US2021/022866—International Search Report and Written Opinion dated Aug. 9, 2021, 16 pages.
U.S. Appl. No. 17/344,824—Office Action dated Nov. 12, 2021, 7 pages.
U.S. Appl. No. 17/344,824—Response to Office Action dated Nov. 12, 2021, filed Feb. 11, 2022, 18 pages.
U.S. Appl. No. 17/344,832—Response to Office Action dated Nov. 12, 2021, filed Feb. 11, 2022, 22 pages.
U.S. Appl. No. 17/344,832—Office Action dated Nov. 12, 2021, 7 pages.
U.S. Appl. No. 17/344,824—Notice of Allowance dated Apr. 28, 2022, 12 pages.
U.S. Appl. No. 17/344,832—Notice of Allowance dated Mar. 23, 2022, 13 pages.
EP 21718321.9—Response to Communication pursuant to Rules 161(1) and 162 EPC dated Oct. 25, 2022, filed Mar. 18, 2021, 13 pages.
PCT/US2021/022866—Invitation to Pay Additional Fees And, Where Applicable, Protest Fee, dated Jun. 17, 2021, 9 pages.
EP 21718321.9—First Examination Report dated Sep. 13, 2023, 6 pages.
PCT/US2022/050638—International Search Report and Written Opinion dated Mar. 16, 2023, 12 pages.
Rescorla, E.: "WebRTC Security 1-22 Architecture; rfc8827. txt", WebRTC Security Architecture; RFC8827.TXT, Internet Engineering Task Force, IETF; Standard, Internet Society (ISOC) 4, Rue Des Falaises CH-1205 Geneva, Switzerland, Jan. 19, 2021 (Jan. 19, 2021) , pp. 1-22, XP015143828, Retrieved from the Internet: URL:https://tools.ietf.org/html/rfc8827.
Anonymous: "A Study of WebRTC Security", Sep. 7, 2021 (Sep. 7, 2021),pp. 1-34, XP093029603, Retrieved from the Internet: URL:https:// web.archive.org/web/2021090723 4756/https://webrtc-security.github. io/.
Friese Ingo et al: "Cross-domain discovery of communication peers: Identity Mapping and Discovery Services (IMaDS)", 2017 European Conference on Networks and Communications (EUCNC), IEEE, Jun. 12, 2017 (Jun. 12, 2017), pp. 1-6, XP033122207, DOI: 10.1109/EUCNC.2017.7980642.
Fette, I., et al.: "The WebSocket Protocol; rfc6455.txt", The Websocket Protocol; RFC6455.TXT, Internet Engineering Task Force, IETF; Standard, Internet Society (ISOC) 4, Rue Des Falaises CH-1205 Geneva, Switzerland, Dec. 11, 2011 (Dec. 11, 2011), pp. 1-71, XP015081377.
Anonymous: "Domain verification with a TXT Record (alternative method)—Squarespace Help", Jul. 8, 2021 (Jul. 8, 2021), pp. 1-7, XP093029629, Retrieved from the Internet: URL:https://web.archive. org/web/20210708173731/https://support.squarespace.com/hc/en-us/articles/205812388.
PCT/US2022/050638—Second Written Opinion dated Nov. 15, 2023, 9 pages.
Anonymous: "Renewing your domain name", Mar. 1, 2010, pp. 1-4, XP093100027, Retrieved from the Internet: URL:https://web.archive. org/web/20100301125901/https://manage.whois.com/kb/servlet/ KBServlet/faq943.html.
PCT/US2022/050638—International Preliminary Report on Patentability dated Feb. 7, 2024, 9 pages.
PCT/US2022/050638—Response to International Search Report and Written Opinion filed Sep. 22, 2023, 18 pages.
PCT/US2021/022866—International Preliminary Report on Patentability dated Sep. 29, 2022, 9 pages.

(56)        References Cited

OTHER PUBLICATIONS

U.S. Appl. No. 17/990,622, filed Nov. 18, 2022 US 20230164266
A1, May 25, 2023.

* cited by examiner

FIG. 1B

Example Resource Records 305

| Type | Description | Function |
|---|---|---|
| CNAME | Canonical Name Record | Alias of one name to another name |
| A | Address Record | 32 bit IPv4 address |
| AAAA | Address Record | 128 bit IPv6 address |
| MX | Mail Exchange Record | Maps a domain name to a list of message transfer agents for that domain |

FIG. 3A

Case #1: Conflicted Records 310

Resource Record 312

```
ServiceId: 1
Payload:
    [
        {
            Host: '@',
            Record: 'A',
            Value: '72.3.2.1'
        },
    ]
```

Resource Record 314

```
ServiceId: 2
Payload:
    [
        {
            Host: '@',
            Record: 'AAAA',
            Value: '2001:0db8:85a3:0000:0000:8a2e:0370:7334'
        },
    ]
```

FIG. 3B

Case #2: Conflicted Records 315

Resource Record 317

```
ServiceId: 1
Payload:
    [
        {
            Host: '@',
            Record: 'A',
            Value: '72.3.2.1'
        },
    ]
```

Resource Record 319

```
ServiceId: 2
Payload:
    [
        {
            Host: '@',
            Record: 'A',
            Value: '73.6.4.5'
        },
    ]
```

FIG. 3C

Case #3: Non-Conflicting Records on Different Hosts 320

Resource Record 322

```
[
  {
    Host: 'blog',
    Record: 'A',
    Value: '72.3.2.1'
  },
]
```

Resource Record 324

```
[
  {
    Host: '@',
    Record: 'AAAA',
    Value: '6812:0db7:85a3:0000:0000:8a2e:1052:0310'
  },
]
```

FIG. 3D

Case #4: Non-Conflicting Records on Same Hosts 330

Resource Record 332

```
[
    {
        Host: '@',
        Record: 'A',
        Value: '72.3.2.1'
    },
]
```

Resource Record 334

```
[
    {
        Host: '@',
        Record: 'MX',
        Value: 'examplemail.startrekenterprise.com'
    },
]
```

FIG. 3E

Current DNS Records (Domain Connected to Hosting)    401

| Type | Host | Value | connectionId | groupId |
|------|------|-------|--------------|---------|
| A | @ | 1.1.1.1 | 57 | web |
| A | mail | 1.1.1.1 | 57 | email |
| MX | @ | mail.example.com | 57 | email |
| A | cpanel | 1.1.1.1 | 57 | system |

DNS for New Connection (Gsuite)    411

| Type | Host | Value |
|------|------|-------|
| MX | @ | mail.google.com |

Resulting DNS Records (Partial Conflict Resolution)    421

| Type | Host | Value | connectionId | groupId |
|------|------|-------|--------------|---------|
| A | @ | 1.1.1.1 | 57 | web |
| MX | @ | mail.google.com | 58 | null |
| A | cpanel | 1.1.1.1 | 57 | system |

Figure 6:
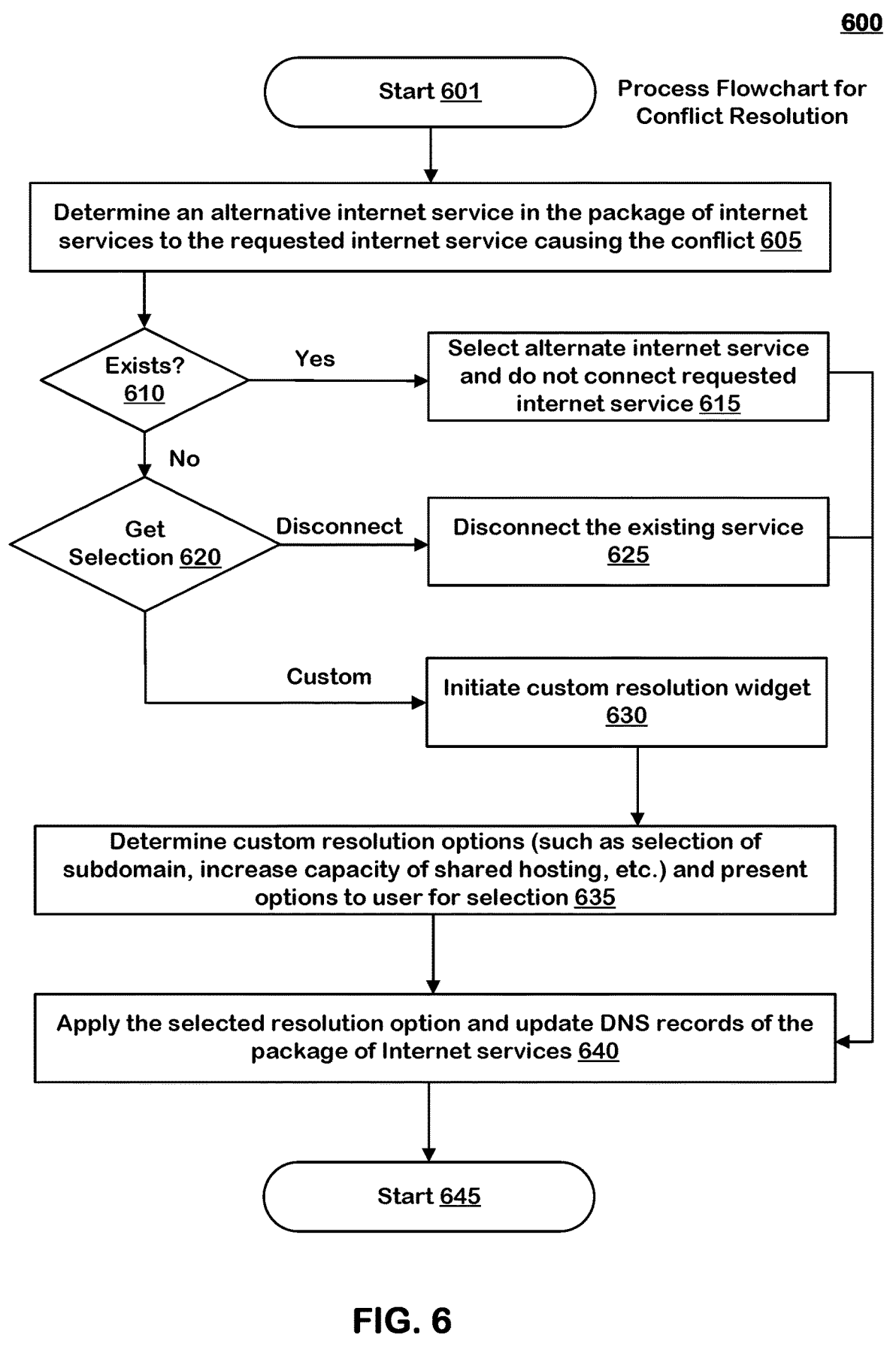

Start 601

Process Flowchart for
Conflict Resolution

Determine an alternative internet service in the package of internet
services to the requested internet service causing the conflict 605

Exists?
610

Yes → Select alternate internet service
and do not connect requested
internet service 615

No

Get
Selection 620

Disconnect → Disconnect the existing service
625

Custom → Initiate custom resolution widget
630

Determine custom resolution options (such as selection of
subdomain, increase capacity of shared hosting, etc.) and present
options to user for selection 635

Apply the selected resolution option and update DNS records of the
package of Internet services 640

Start 645

Conflict Detection and Resolution - Stage1 and Stage 2

750

Conflict Detection and Resolution  - Stage 3

770

Custom Conflict Resolution Widget

1

SYSTEMS AND METHODS FOR DIGITALLY UNBOXING INTERNET SERVICES

PRIORITY APPLICATIONS

This application is a continuation-in-part of U.S. patent application Ser. No. 18/525,547, entitled "Systems and Methods for Detecting Conflicts in Internet Services", filed Nov. 30, 2023, which is a continuation of U.S. patent application Ser. No. 17/875,824, entitled "Systems and Methods for Detecting Conflicts in Internet Services", filed Jul. 28, 2022 which is a continuation of U.S. patent application Ser. No. 17/344,824, entitled "Systems and Methods for Detecting Conflicts in Internet Services", filed Jun. 10, 2021, which is a continuation of U.S. patent application Ser. No. 16/823,265, entitled "Systems and Methods for Detecting Conflicts in Internet Services", filed Mar. 18, 2020; this application is also a continuation-in-part of U.S. patent application Ser. No. 18/540,742, entitled "Systems and Methods for Resolving Conflicts in Internet Services", filed Dec. 14, 2023, which is a continuation of U.S. patent application Ser. No. 17/872,891, entitled "Systems and Methods for Resolving Conflicts in Internet Services", filed Jul. 25, 2022, which is a continuation of U.S. patent application Ser. No. 17/344,832, entitled "Systems and Methods for Resolving Conflicts in Internet Services", filed Jun. 10, 2021, which is a continuation of U.S. patent application Ser. No. 16/823,267, entitled "Systems and Methods for Resolving Conflicts in Internet Services", filed Mar. 18, 2020. The priority non provisional applications are hereby incorporated by reference for all purposes.

COPYRIGHT NOTICE

FIELD OF THE TECHNOLOGY DISCLOSED

The technology disclosed relates generally to domain name systems (DNS), and in particular relates to digitally unpackaging and auto-installing one or more hosted Internet service products from a set of available hosted Internet service products and detecting and resolving conflicts between the requested Internet service product and Internet service products already associated with the domain.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Users of domain name systems such as administrators or owners of domains in a domain name system (DNS) often require connecting Internet service products (also referred to as Internet services) to domains. In some cases, users acquire a new domain but may be unaware of potential new Internet service products that can be connected to the new domain. In some cases, the users of a domain may not be aware of which additional Internet service products can be connected to an existing domain. Additionally, connecting new Internet service products can cause conflicts with existing connecting Internet service products connected to the domain. For example, an email service can be associated with a domain allowing the users of the domain to send and receive emails. A disk storage service can also be associated with a domain to allow users to store and access documents and other data. Conflicts can arise between Internet services associated with a domain and requested Internet service due to various reasons. For example, a conflict can arise when an administrator of a domain attempts to connect a new email service with a domain that already has an email service associated with it. The conflicts between Internet services, plugins or products can result in disruption of service provided by the domain. The disruption of service can result in poor user experience and possibly loss of revenue for domain owners. Moreover, when conflicts occur between Internet services, the administrators need to debug the system to find the cause of the failure, determine the conflict and then manually resolve the conflict.

Accordingly, an opportunity arises for the development of a technology that can automatically recommend new Internet service products to connect to a domain as well as allowing conflict detection and resolution to avoid disruption of services provided by the domain.

SUMMARY

Described with reference to example implementations are systems and methods for digitally unpackaging and auto-installing one or more hosted Internet service products from a set of available hosted Internet service products. Digital unpackaging (or digital unpacking) technology enables setting up a connection of the product to other products and can even allow resolving any needed "pre-configuration" that may be essential (or recommended) prior to using the product. The goal of digital unpackaging technology is to make sure that the Internet service products are properly connected and ready for use by the users of such products. The technology can also provide the user the option to take the first steps in product usage. The method includes receiving a selection of a starting point and determining whether the selected starting point is one selected from (i) a domain and (ii) a hosted Internet service product. If the starting point selected is a domain, then the method includes performing the following operations. The method includes prompting for and receiving a selection of at least one hosted Internet service product category in a plurality of hosted Internet service product categories. The method includes, for each hosted Internet service product category in the selection of the at least one hosted Internet service product category, prompting to receive a selection of a particular hosted Internet service product to connect to the domain until a set of hosted Internet service products is received. Otherwise, if the starting point selected is a hosted Internet service product, then the method includes performing the following operations. The method includes, for the hosted Internet service product, prompting for and receiving at least one domain to connect to the hosted Internet service product. The method includes, for the hosted Internet service product and each domain, prompting for and receiving a selection of at least one other hosted Internet service product belonging to a hosted Internet service product category to connect to the domain from a set of hosted Internet service product categories. The method includes setting up connections between hosted Internet service products selected and configuring the hosted Internet service products selected. The method includes providing the hosted Internet service products selected as configured to an installation process.

In one implementation, the method includes, testing the set of hosted Internet service products for conflicts between hosted Internet service product selections in the set of hosted Internet service products, and if conflicts are detected, initiating resolution process to resolve the conflicts detected.

The configuring the hosted Internet service products selected further includes setting up parameter values for the hosted Internet service products selected.

When the starting point selected is a domain, the method includes, prompting for and receiving the selection of at least one hosted Internet service product category. The prompting for and receiving the selection of at least one hosted Internet service product category further includes performing the following operations. The method includes determining whether the selection of at least one other hosted Internet service product belonging to a hosted Internet service product category to connect to the domain includes at least one hosted Internet service product that is already connected to the domain. If the above-mentioned determination is correct, the method includes omitting prompting any hosted Internet service product categories to which the selection of at least one hosted Internet service product, already connected to the domain, belongs.

The plurality of hosted Internet service product categories can include a hosting service product category, email service product category, security service product category, communications service product category and cloud-based storage service product category. It is understood that technology disclosed includes logic to incorporate additional Internet service product categories.

In one implementation, the method includes dynamically building a library of hosted Internet service product categories. A product category can comprise a set of products, and wherein the library of hosted Internet service product categories is dynamically created during digitally unpackaging and auto-installing one or more products from a set of available products based on a prior selection of at least one hosted Internet service product selected from (i) the domain and (ii) the hosted Internet service product.

The library of hosted Internet service product categories can include two or more hosted Internet service products belonging to a single product category. The method further includes, blocking more than one of the two or more hosted Internet service products to be included in the set of hosted Internet service products. The technology disclosed may not allow selection of multiple products from a same product category.

The blocking more than one of the two or more hosted Internet service products to be included in the set of products further includes permitting only one hosted Internet service product from the respective hosted Internet service product category to be selected.

Hosted Internet service products from different hosted Internet service product categories are packaged together in packages and entered into the library. The method further includes, for a domain, upon receiving selection of a hosted Internet service product in the package, including other hosted Internet service products in the package into the set of products for the domain.

The technology disclosed can proactively detect any potential conflicts that can arise when the two or more selected products are connected to the domain. The technology disclosed may also invoke external components, devices and/or engines that implement the logic to detect conflicts and/or resolve conflicts. For example, if a user selects two different email products for connecting to the domain. The auto-installation engine can detect the potential conflict and provide an option to the user to select one of the two selected email products to avoid future conflicts by testing the set of hosted Internet service products for potential conflicts between product selections in the set of products can result in detection of potential conflicts. If potential conflicts are detected, a resolution process to resolve the potential conflicts detected can be initiated. Auto-installation engine can search for attribute fields indicating attributes of hosted Internet service products in the set of hosted Internet service products and compare attributes of each selected hosted Internet service product in the set of hosted Internet service products to attribute fields of remaining hosted Internet service products in the set of hosted Internet service products using a set of conflict definitions to identify attributes of a selected hosted Internet service product that conflict with attributes of remaining hosted Internet service products in the set of products. The technology disclosed can therefore detect conflicts prior to connecting of the Internet service products to domains by analyzing the selected Internet service products. Whenever conflicting attributes are identified, the disclosed technology provides for, invoking a resolution process to resolve the conflict. Resolving the conflict includes at least initiating a request for a selection from (1) removing a conflicting hosted Internet service product from the set of products and offering to perform adding a substitute hosted Internet service product, (2) preserving the hosted Internet service products in the set of products and declining a request to add a hosted Internet service product selected, and (3) using a subdomain instead of a domain, receiving a selection, and triggering a further process to implement the selection requested.

Searching for attribute fields indicating attributes of hosted Internet service products further includes searching domain name system entries for attribute fields indicating attributes of hosted Internet service product in the set of products.

Configuring hosted Internet service products selected further includes the following operations. The method includes outputting at least one configuration parameter for the particular hosted Internet service product selected. The method includes receiving a value for the at least one configuration parameter. The method includes updating the particular hosted Internet service product by setting the at least one configuration parameter with the value received.

The hosting service product category includes at least one of a Shared Hosting, Virtual Private Server (or VPS), Dedicated Servers, App-based hosting services.

The App-based hosting services are provided for hosting products, such as for example and without limitation, Word-Press™ product(s),Drupal™ product(s) and others, as well as combinations or suites of products.

The email service product category can include at least one of a cloud-based email product, a web-based email product and an endpoint to endpoint encrypted email product.

The security service product category can include at least a secured socket layer (SSL) product wherein the SSL comprises data that defines connection of the SSL product to the domain.

The communications service product category can include at least a voice communication product, a data communication product and a video communication product. The voice communication product, the data communication product and the video communication product can establish link to the domain using proprietary domain name server records including the domain as an identifier.

A system including a hardware processor and memory storing machine instructions that implement the method presented above is also disclosed. Computer program products which can be executed by the computer system are also described herein.

Other aspects and advantages of the present invention can be seen on review of the drawings, the detailed description and the claims, which follow.

BRIEF DESCRIPTION OF THE DRAWINGS

The invention will be described with respect to specific embodiments thereof, and reference will be made to the drawings, which are not drawn to scale, and in which:

FIGS. 1B, 1C, 1D and 1E present various aspects of the unpackaging process to connect Internet service products to domains.

FIG. 3A presents a table with selected examples of resource records types and their descriptions.

FIGS. 3B and 3C present examples of conflicting resource records.

FIGS. 3D and 3E present examples of non-conflicting resource records.

FIG. 4 is an example of partial conflict detection and resolution.

FIG. 6 is a process flowchart presenting process steps for conflict resolution.

DETAILED DESCRIPTION

Figure 1A:
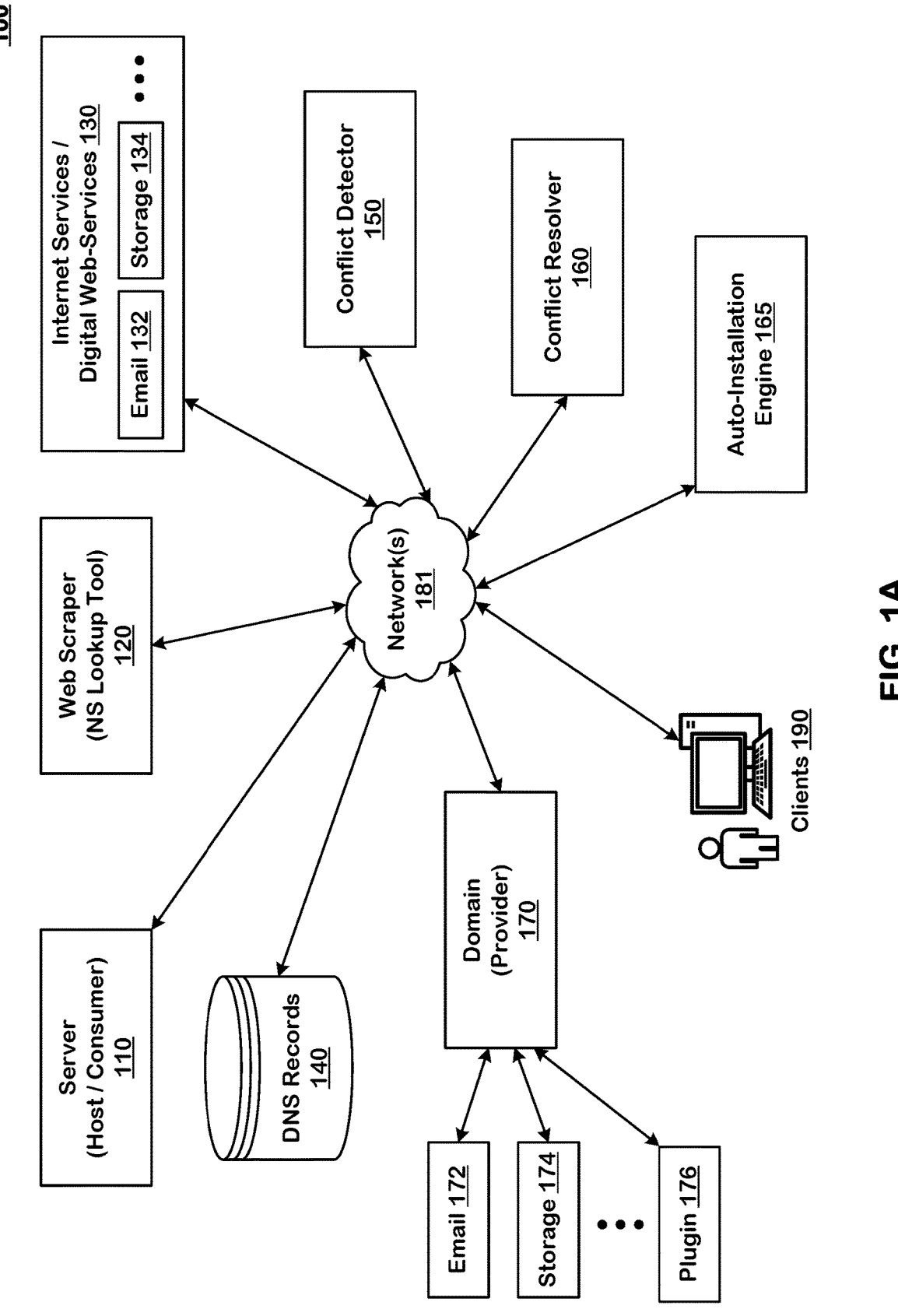
FIG. 1A is a simplified diagram of one environment 100 implementing the technology disclosed for unpackaging of Internet service products.

The technology disclosed provides a method for digital unpackaging and automatic installation of Internet service products. The process of installation of Internet service products can either start with a domain or with an Internet service product (also referred to as a hosted Internet server product). For example, a user may already have a registered domain and wants to connect one or more additional Internet service products to the domain, in this case, the unpackaging and installation process starts with the domain and the Internet service products are connected to the domain. The process can also start with the selection of an Internet service product (also referred as hosted Internet service product). In this case, the technology disclosed prompts the user to provide the domain to which the Internet service product is to be connected. Upon selection of the domain (or registration of a new domain), the technology disclosed connects the Internet service product to the domain and can prompt selection of further Internet service products to connect to the domain. The technology disclosed provides one embodiment in which user interface elements (such as buttons, links, etc.) that can be selected by a user to initiate the digital unpackaging process. The user interface elements can be provided on a domain and/or on an Internet service product acquired by a user for connecting to a domain. In one alternative implementation, semantic analysis is conducted upon an input string to determine whether the input string indicates a domain or an Internet service product. In another alternative, a data structure or file type is checked to determine whether a domain or an Internet service product is being provided. In a yet further embodiment, a neural network or other machine intelligence classifier is trained using a training data set to indicate a proper choice of pathways based upon characteristics of the received package or packages. Data sets can include labelling of characteristics of packages and types of products included and proper, as well as improper, outcomes for the selection.

In both of the above-mentioned digital unpackaging and auto-installation paths, i.e., the first path (starting with a domain) and the second path (starting with an Internet service product), technology disclosed allows selection of further Internet service products to connect to the domain. The technology disclosed organizes the Internet service products in various hosted Internet service product categories. For example, the hosted Internet service product categories can include a hosting service product category, email service product category, security service product category, communications service product category and cloud-based storage service product category. It is understood that the technology disclosed can include additional categories of hosted Internet service products. The technology disclosed includes logic to set up connections between selected hosted Internet service products and also to configure the selected hosted Internet service products. The technology disclosed includes logic to provide the selected hosted Internet service products as configured to an installation process. The technology disclosed provides a library of hosted Internet service product categories that comprises Internet service products in respective Internet service product categories. The technology disclosed includes logic to dynamically update the library with Internet service products as needed for connection with the domain. Further details of selection of Internet service products and configuration of hosted Internet service products are presented in the following sections.

The Domain Name System (DNS) is used on the Internet to provide a standard naming convention for locating IP-based computers. The DNS is a distributed database system for managing host names and their associated Internet Protocol (IP) addresses. A single server might be responsible for knowing host names and IP addresses for a small part of a zone, but DNS servers can together map all domain names to the IP addresses. DNS implements a hierarchical naming system called the domain namespace. We now briefly present some DNS concepts.

DNS Servers are computers that run DNS server programs containing DNS database information about the DNS domain tree structure. DNS servers also attempt to resolve client queries. When queried, DNS servers can provide the requested information or provide a pointer to another server that can help resolve the query or respond that it does not have the information or that the information does not exist.

DNS resolvers are programs that use DNS queries to query for information from servers. Resolvers can either communicate either with remote DNS servers or the DNS server program running on the local computer.

Resource Records are sets of information in the DNS database that can be used to process client queries. Each DNS server contains the resource records it needs to answer queries for the portion of DNS namespace for which it is authoritative. A DNS server is authoritative for a contiguous portion of the DNS namespace if it contains information about the portion of the namespace. Resource records are used to store data about domain name and IP addresses. A resource record specifies information about a domain such as an IP address, a mail server receiving email for the domain, mapping of an alias domain name to a canonical (true) domain name, etc.

Zone are contiguous portions of the DNS namespace for which the server is authoritative. A server can be authoritative for one or more zones. Zone files contain resource records for the zones for which the server is authoritative.

Administrators of domains can add Internet services or Internet service products (also referred to as digital services or web services) to their domains. An Internet service (or simply a service) can be a product, subscription or functionality that a user can engage with in order to use a website effectively. Examples of such services include email, disk space or plugins such as EasyWP™, WebsiteBuilder™, etc. One or more resource records can be generated per service and stored as part of the resource records table for a domain Conflicts can arise between services when administrators attempt to add new services to a domain Such conflicts can arise due to multiple reasons. A new requested service can be incompatible with one or more of the existing services associated with the domain. For example, if an administrator attempts to connect a cloud-based email hosting service with a domain that is already connected to private email hosting service, a conflict can arise as two email hosting services cannot be connected to the domain simultaneously. Such conflicts can result in integration issues leading to disruptions in domain related services. Manually detecting these conflicts can require considerable resources and may impact end customer experience. The technology disclosed automatically detects such conflicts and attempts to resolve the conflicts by proposing solutions to the administrator.
Environment We describe a system for digitally unpackaging and auto-installing one or more hosted Internet service products from a set of available hosted Internet service products. FIG. 1A is a simplified diagram of one environment 100 of the system in accordance with an implementation. Because FIG. 1A is an architectural diagram, certain details are intentionally omitted to improve the clarity of the description. The discussion of FIG. 1A is organized as follows. First, the elements of the figure are described, followed by their interconnection. Then, the use of the elements in the system is described in greater detail.

FIG. 1A includes the system 100. This paragraph names labeled parts of the system 100. The figure illustrates a server 110, web scrapper 120, Internet services (also referred to as digital services or web services) 130, DNS records 140, a conflict detector 150, a conflict resolver 160, an auto-installation engine 165, a domain 170, a network(s) 181 and clients 190. The Internet services 130 can comprise email services 132, storage services 134, etc. The domain 170 can have various associated Internet (or digital) services such as an email 172, a disk storage 174, and a plugin 176, associated with it.

Server (also referred to as DNS server) 110 can store information about zones. Only one server in system 100 is shown for simplifying the illustration. It is understood that more than one server can be used in a distributed manner to respond to queries for resolving domain names. For example, when a DNS server receives a DNS query, it attempts to locate the requested information by retrieving data from its local zone. The DNS database namespace (directory) is split into zones and sub-zones. A zone is a point of delegation within the DNS tree so that a name server is authoritative for the domains that are grouped within the zone and any sub-zones below it. A primary name server is where the zone's domain names and host resource records are loaded manually into the configuration database. The secondary name servers populate their databases from the primary DNS server. The zones are expressed in the form of resource records. These records can be transferred between DNS servers. DNS servers perform caching, whenever they receive information from other servers, they store the information for a certain amount of time.

To resolve domain names, the DNS servers access their zones. The zones contain resource records. A DNS records database 140 can be used to store resource records. The resource records contain information associated with the DNS domain. For example, some resource records map friendly names to IP addresses, others map IP addresses to friendly names, resource records can indicate services, products or plugins associated with a domain name. If the DNS server or the web server cannot find resource records for a domain in the DNS records database 140, it can apply a web scrapper 120 to search external databases for resource records associated to a domain name. NsLookUp is an example software tool that can be used to lookup a domain name. The tool can query external DNS databases and retrieve requested resource records that are associated with the domain name. Other types of web scrapping tools can be used to gather resource records from external databases.

Administrators or owners of domains can associate Internet services with their domains using clients 190. End users of the domain and their services can also access the system using clients 190. The Internet services can include cloud-based or private email, cloud-based disk storage services or other types of services such as plugins for website development, etc. Each Internet service defines one or more resource records that are associated with the domain Resource records can include attributes for example, an "owner" identifier indicating the name of the host of the DNS domain name to which this resource record belongs; "time to live" (TTL) indicating the length of time that a DNS server or a resolver should cache this record entry before it is discarded, a "type" identifier indicating the type of resource record, a "value" of resource identifiers, etc. The resource records can also include values for attributes of the Internet services. The services are associated with a DNS domain via resource records. FIG. 1A shows a DNS domain 170 with an email 172, a disk storage 174 and a plugin 176 associated with it. There may be other Internet services associated with the DNS domain 170 not shown in the figure.

The auto-installation engine 165 includes logic for automatic installation of Internet service products including selection of Internet service products from a plurality of Internet service product categories for connecting to a domain and configuration of Internet service products connected to the domain. The auto-installation engine 165 includes logic to automatically configure the selected Internet service products that are connected to a domain. The installation process can include adding a new Internet service product to an existing domain or starting the process from a new domain and adding new Internet service products to the domain. The auto-installation engine 165 can access and utilize the logic implemented by the conflict detector 150 and the conflict resolver 160 during the installation process. Further details of the auto-installation engine 165 are presented with reference to FIGS. 1B-1E, 2A-2B and 9A-9H.

When an administrator of a domain attempts to connect a new Internet service with the DNS domain 170, the conflict detector 150 includes the logic to detect a possible conflict of the requested Internet service with the existing Internet services associated with the domain. For example, the administrator may attempt to connect a new email service with the DNS domain 170. As the DNS domain 170 already has an email 172 associated with the domain 170, the conflict detector will detect a conflict between the requested Internet service and the existing Internet service. The conflict detector 150 can compare attributes of resource records for the requested Internet service with attributes of resource records in the package of Internet services associated with the domain 170 and use a set of conflict definitions to identify attributes of the requested Internet service conflicting with the attributes of the package of Internet services. Thus, the conflict detector 150 can prevent any interruptions of the services provided by the DNS domain by detecting conflicts before the requested Internet service is associated with the domain. The conflicts can result in expensive debugging and maintenance activities and also result in poor customer experience for the users of the DNS domain.

The technology disclosed not only detects conflicts of the requested Internet service with the package of Internet services already associated with the DNS domain but also provides conflict resolution options to owners or administrators of the DNS domain. The conflict resolver 160 can also automatically resolve the conflicts using one of the resolution options or present the options to an administrator to select a resolution for the detected conflict. A first conflict resolution option can include selecting an alternate Internet service in the package of Internet services to substitute for the requested Internet service. A second conflict resolution option can include replacing an existing connection with a service in the package of Internet services with the requested Internet service. A third option for conflict resolution can include initiating a custom resolution application that can include presenting a custom application or a widget to the administrator for this purpose. The administrator can then interact with the widget to resolve the conflict.

Completing the description of FIG. 1A, the components of the system 100, described above, are all coupled in communication with the network(s) 181. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, 5G, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications.

Process for Unpackaging and Auto-Installation of Internet Service Products

FIGS. 1B to 1E present various process operations for unpackaging and auto-installation of internet service products.

Figure 1B:
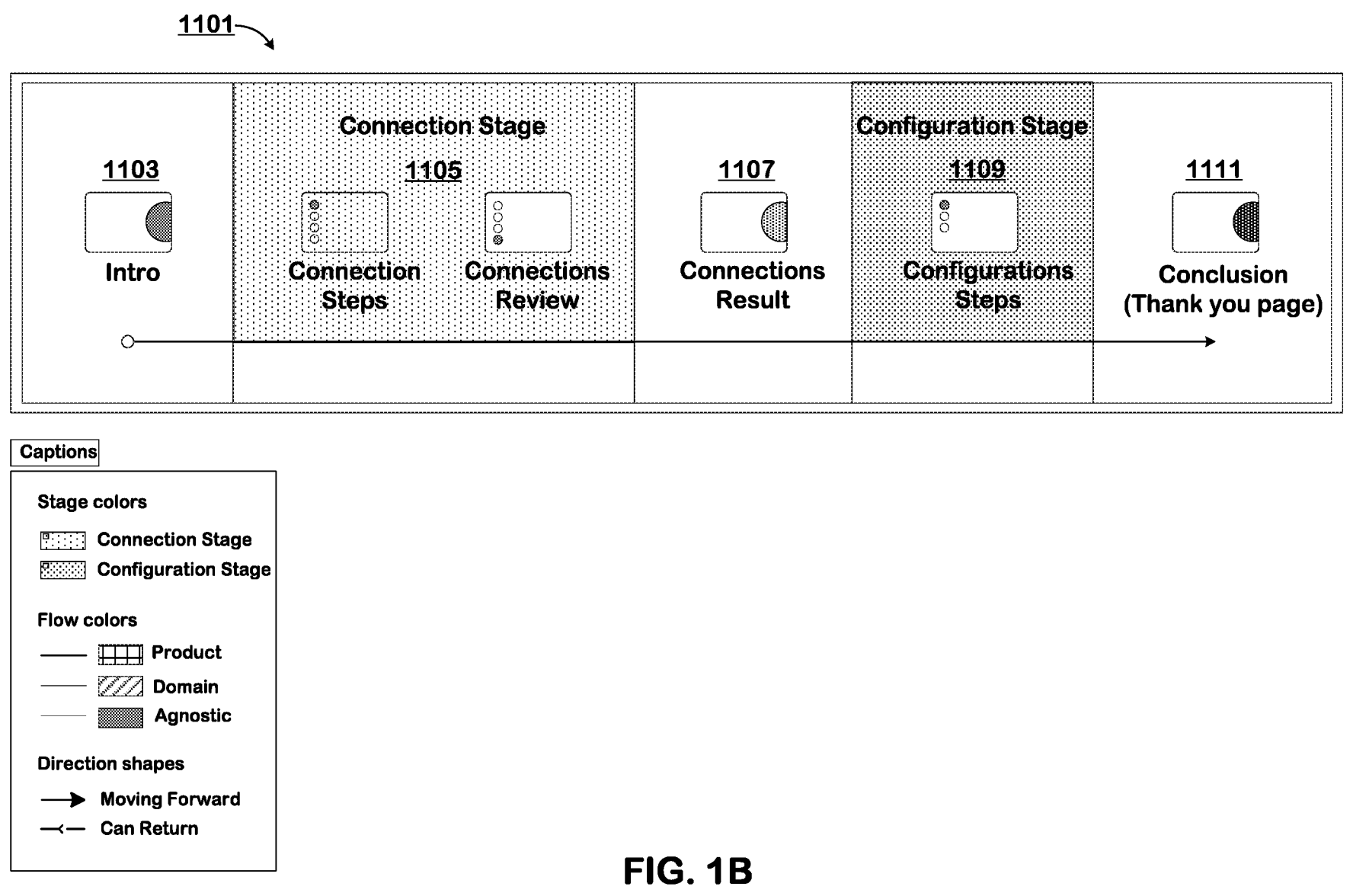

FIG. 1B presents a process flow 1101 presenting high-level process steps for unpackaging and auto-installing Internet service products. The process includes an introduction operation 1103 during which, the name of the product being unpackaged can be made available to the user (e.g, displayed on a user interface, presented aurally by speaker, headphone or ear buds, or combinations thereof). The user can select the product to start the unpackaging (or unpacking or unboxing) process. Following the operation 1103, one of the two paths is followed depending upon whether a selected starting point is one selected from (i) a domain and (ii) a hosted Internet service product. In an implementation, the starting point is input from a user indicating a path to proceed. In another implementation, the starting point includes presentation of a package or packages desired to be installed. The technology disclosed can include in such case, determining from the package characteristics which pathway to undertake. In some implementations, a neural network or other machine intelligence classifier is trained using a training data set to indicate a proper choice of pathways based upon characteristics of the received package or packages. Data sets can include labelling of characteristics of packages and types of products included and proper, as well as improper, outcomes for the selection. In a yet further implementation, the classifier can be trained to predict based upon environmental inputs (such as customer's previous purchases, search history, etc.) whether the customer will begin with a domain name or an Internet service. In an alternative implementation, a name or text string associated with the input received is examined using e.g., semantic analysis, to determine whether a package or a domain name is being provided, and hence which pathway is appropriate. In another alternative implementation, a package content data structure is examined to determine package content and therefore pathway to proceed. The users who are not familiar with the process are provided introductory materials such as videos, graphics or other types of documentation describing the process operations.

The connection stage 1105 comprises two operations i.e., connections steps and connections review. Connection stage processes are shaded in blue in FIG. 1B and accompanying figures. The users can select internet service products for unpackaging in the connections stage. The products selected by the user are then unpackaged and configured in the following operation steps. Users can review the product selections in the connections review operation. The results of connections can be presented to users in a connections results operation 1107. The configuration stage 1109 includes logic to configure the Internet service products for the user. Configuration stage processes are shaded in pink in FIG. 1B and accompanying figures. The configurations can be presented to the user for the current Internet service product that is being unpackaged or unboxed. The technology disclosed also includes logic to present configuration options for the Internet service products that are currently being unpackaged but also the products that are selected by the user in the connections stage 1105. The user can also skip the configuration operation for one or more Internet service products. The conclusion operation (1111) completes the connection and configuration operations and informs the user that the connection and configuration of Internet service products is complete or in progress for completion. Some operations needed for connection may require additional process steps or sub-operations such as changing records on external domains, etc. In some cases, the configuration of products can take a longer time such as when creating a website. In such cases, the technology disclosed presents a message to the user that the user may have to wait for some time to be able to use configured products as completion of operations may take additional time. The technology disclosed can send a message (such as via an email, a text message on a cell phone, etc.) to the user upon completion of the configuration process to allow the user to access the configured products.

Figure 1C:
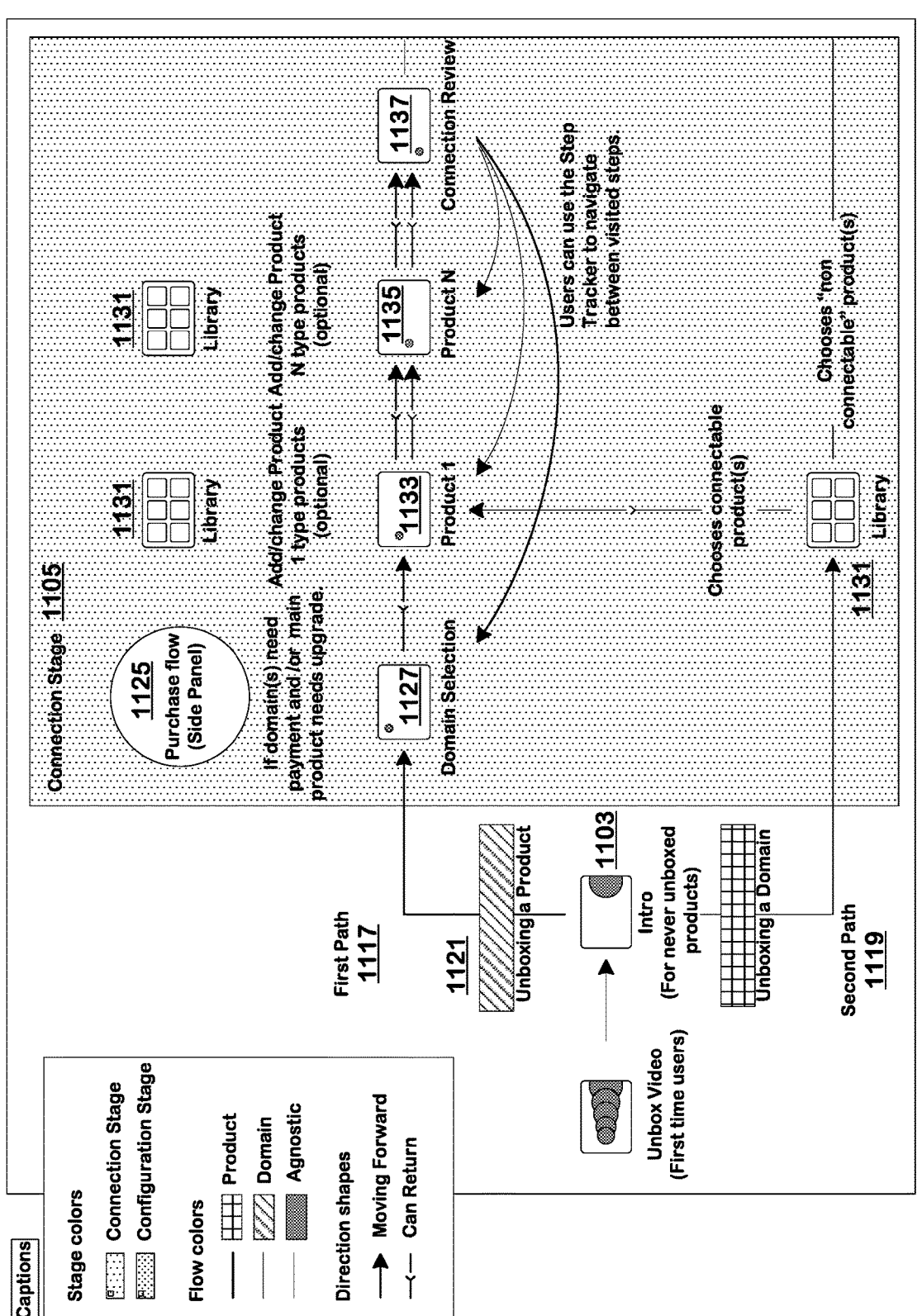
Figure 1D:
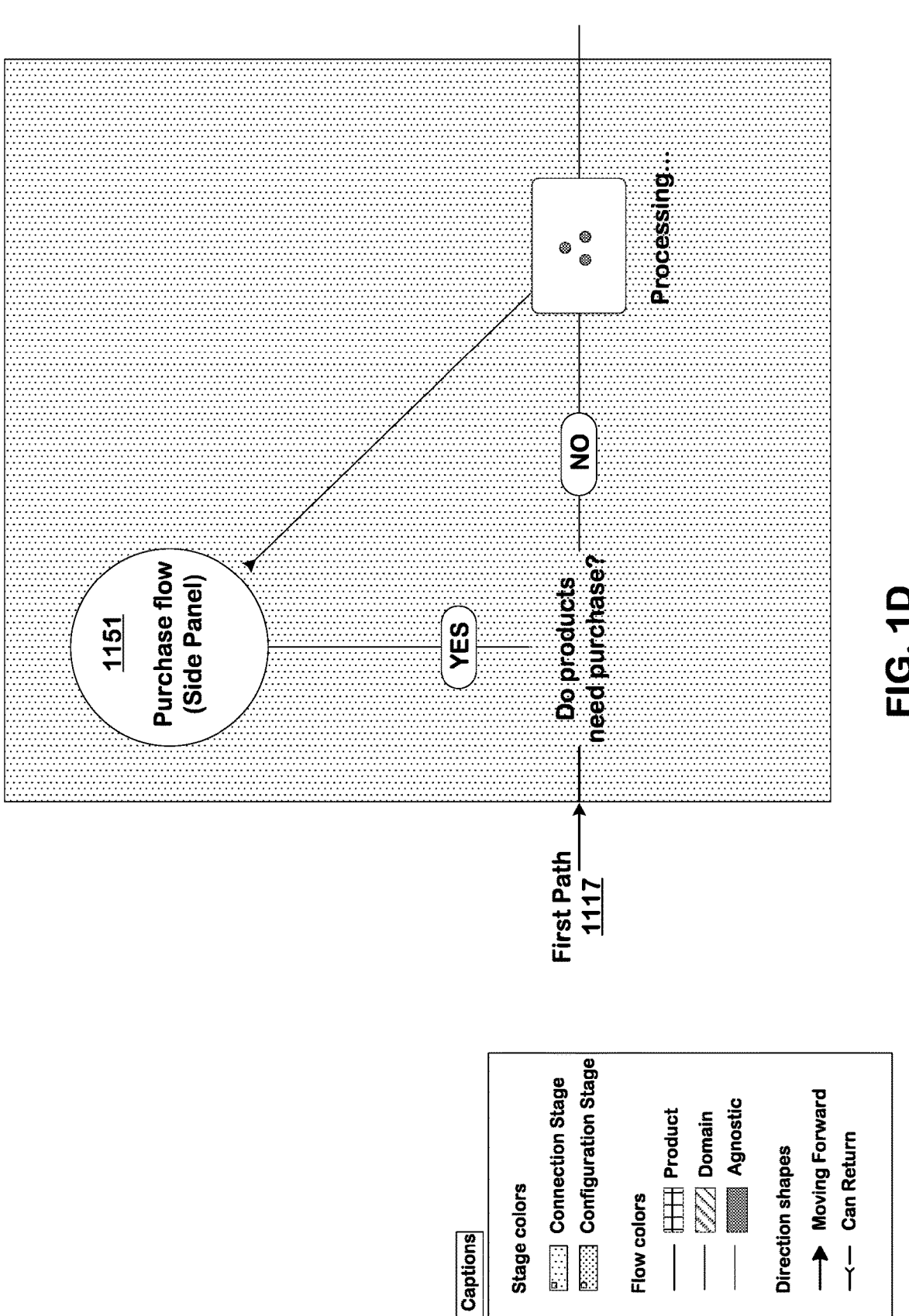
Figure 1E:
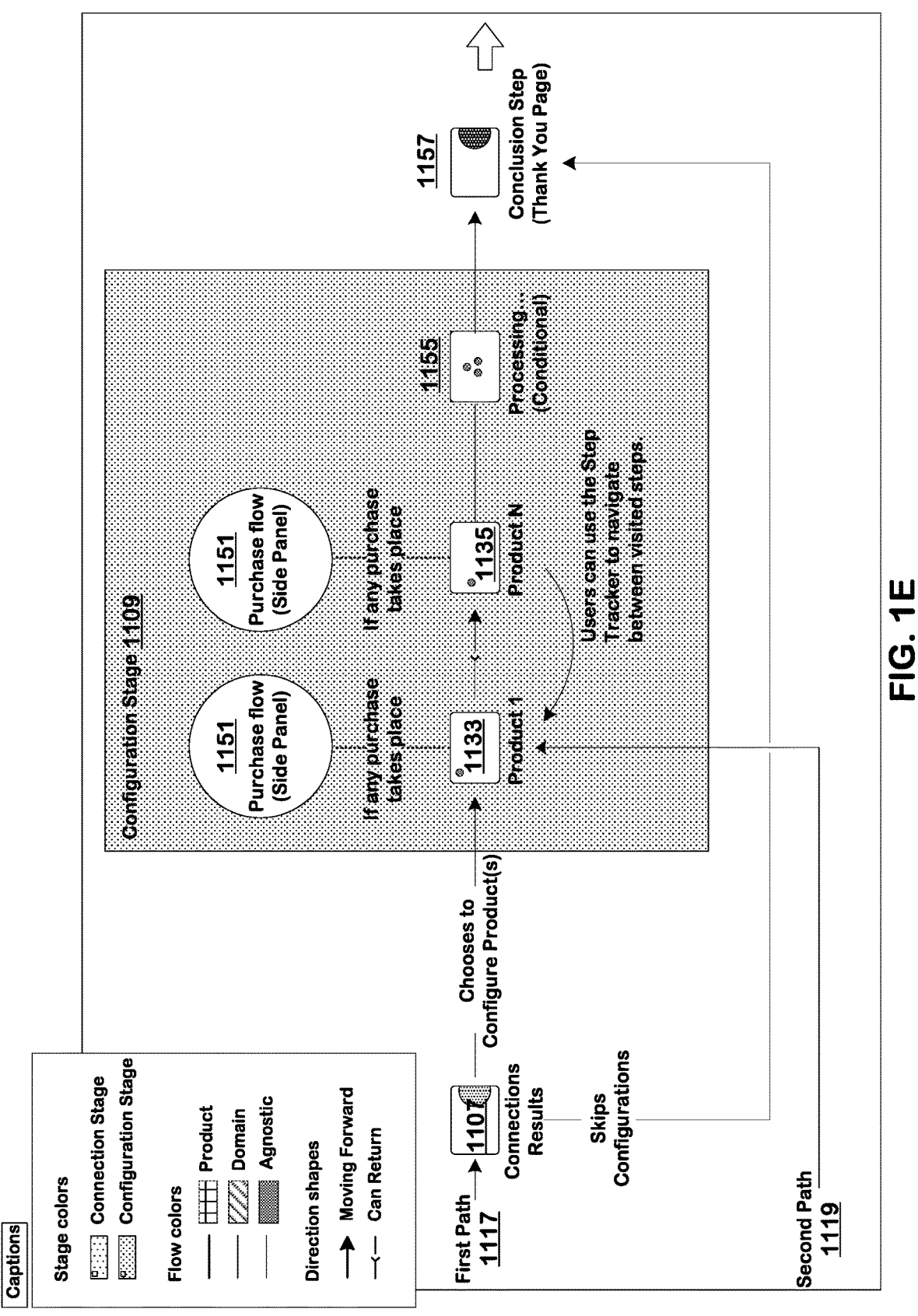

FIGS. 1C, 1D and 1E present a detailed process of connections and configuration operations during unpackaging and auto-installation of Internet service products.

FIG. 1C presents a first part of the process that includes operations in the connection stage 1105. Product flows are depicted using black arrows, domain flows are depicted using green arrows and flows agnostic to product or domain are depicted using blue arrows in FIG. 1C and accompanying figures. The process includes introduction operation 1103 as described above. Following the operation 1103, one of the two paths can be followed to unpackage and auto-installing Internet service products. A first path 1117 starts from an operation labeled as "unboxing a product" 1121 and a second path 1119 starts from an operation labeled as "unboxing a domain" 1123.

The unpackaging (also referred to as unboxing) logic is designed to provide a modular approach when connecting Internet service products to domains. For example, each Internet service product can be connected and configured using separate set of connection and configuration operations that do not impact other Internet service products connected to the domain. Further details of this modular approach become evident as details of the connection and configuration operations are presented below.

When the unpackaging process is initiated by selecting an Internet service product and/or the unpackaging process is initiated by selecting a user interface element from the Internet service product (at operation 1103) then the digital unpackaging (or digital unboxing) for that Internet service product is invoked (at an operation 1121). The auto-installation engine 165 selects the first path (1117) to allow a user to select Internet service products for connecting to one or more domains. A domain selection operation 1127 allows a user to select a domain to connect the Internet service product. The user can select an existing domain or initiate the process to register a new domain for connecting the Internet service product (operation 1125). The selected domain (existing or new) is then used in the following operations to connect Internet service products. For example, a first product (or product 1) can be selected for connecting to the domain during the operation 1133. The auto-installation engine 165 includes logic to access a library 1131 to provide the connectable Internet service products for selecting an Internet service product to connect to the domain.

The technology disclosed includes logic to dynamically build the library 1131 of Internet service product categories. An Internet service product category comprises a set of Internet service products. The library is dynamically created during the unpackaging and auto-installation process by including one or more products (i.e., Internet service products or hosted Internet service products). The library is created based on a prior selection of at least one hosted Internet service product selected from (i) the domain and/or (ii) the hosted Internet service product. The library of hosted Internet service product categories can include two or more hosted Internet service products belonging to a single product category. The technology disclosed includes logic to block more than one of the two or more hosted Internet service products to be included in the set of hosted Internet service products in the case when the single product category does not allow selection of products from the same product category. The blocking of more than one of the two or more hosted Internet service products to be included in the set of products can further include permitting only one hosted Internet service product from the respective hosted Internet service product category to be selected. For example, if a first email Internet service product is already connected to a domain then the technology disclosed may not allow (or block) connecting a second email Internet service product to the domain, or can prompt the user for a selection of which email product to use with that domain, and/or offer the user the capability to specify some other alternative course of action. Some implementations can detect potential or future conflicts with the user's selections. For example if a user selects a product from the library to be connected to the domain when another product from the same category of products already has been chosen to be connected to the domain, then the technology disclosed can detect a potential conflict (or future conflict) of the two selected products production the same category. The technology disclosed can provide an option to the user to either connect the newly selected product or keep the existing first selected product. The technology disclosed informs the user that due to potential future conflicts only one of the two products can be connected to the domain.

Selection of a new product from a same product category can cause a conflict between the new product and the existing connected product from the same product category. The technology disclosed can detect conflicts between Internet service products. Once the conflict is detected, the technology disclosed can initiate a conflict resolution process as described above. The process to add new Internet service products continues allowing the user to connect the desired Internet service products one by one to the domain. For example, the user can add another product at an operation 1135 by accessing the library 1131 of Internet service products. The user can review the Internet service products that are connected to the domain at an operation 1137. The user can also track back to previous operations and make changes to selections of Internet service products.

FIG. 1C also presents a second path 1119 that is followed for connecting Internet service products to a domain. The second path is taken when a user starts the unpackaging process from a domain (operation 1123). The auto-installation engine 165 presents the user with connectable Internet service products from the library 1131. If the user selects an Internet service presented by the library, the process continues at operations 1133, 1135 and 1137. If the user does not select any Internet service product for connecting to the domain as presented by the library then the process continues in an alternate path. Further details of this alternate path are described with reference to FIG. 1E.

FIG. 1D presents a process operation in the first path 1117 that includes an operation 1151 (also referred to as purchase flow operation) for completing product purchase steps. When a user selects an Internet service product from the library 1131 that requires completion of purchase process flow, the auto-installation engine 165 invokes the purchase flow operation 1151. The user can then complete the steps in the purchase flow operation 1151 before proceeding further. If purchase flow is not required for the selected product, then the processing in first path 1117 continues without invoking purchase flow operation 1151.

FIG. 1E presents configuration stage 1109 of the unpackaging (or unboxing) process. The configuration of a connected Internet service product (also referred to as a hosted Internet service product) can include setting values for one or more parameters of the Internet service product. The auto-installation engine 165 can provide to the user, one or more configuration parameters, for receiving the values of the configuration parameter values from the user. The configuration parameters are then set using the values received for respective configuration parameters. Configuration parameters can vary across different Internet service products. For example, for an email product, configurations parameters can include mailbox names, storage reserved and/or send limits, etc. For a webpage, the configuration parameters can include selection of a CMS (content management system) technology for each domain, etc. Both the first path 1117 and the second path 1119 connect to the configuration stage 1109. When connecting from the first path, the process presents connection results (1107) to the user. The connection results present Internet service products connected to the domain during the connection stage 1105 as shown in FIG. 1C. The user can decide either to move forward with the configuration stage and further setup the connected products or to close the process at this stage. The configuration process then continues one by one for each product connected to the domain. For example, the configuration operation for the first connected Internet service product is performed at the operation 1133. If any purchase is required during the configuration of the first product (or product 1), the auto-installation engine 165 invokes the purchase operation 1151. The configuration operation is performed for all or selected Internet service products connected to the domain. The configuration of the last connected product (i.e., product N) is performed at an operation 1135. The auto-installation engine 165 processes configurations for all products at an operation 1155 and presents the user with a conclusion message at an operation 1157.

Figure 2A:
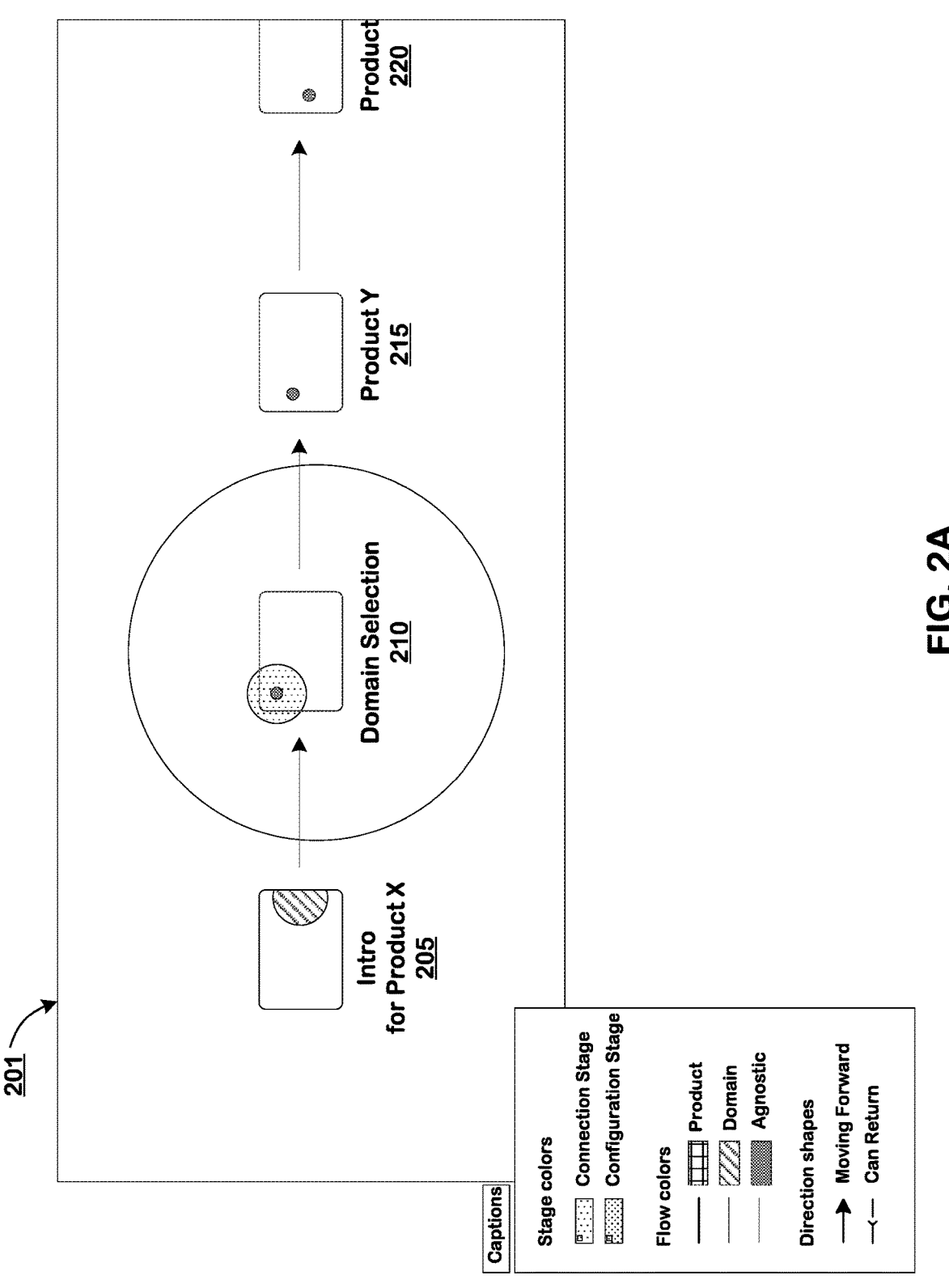
FIGS. 2A and 2B present examples of unpackaging and connecting Internet service products to domains.
Figure 2B:
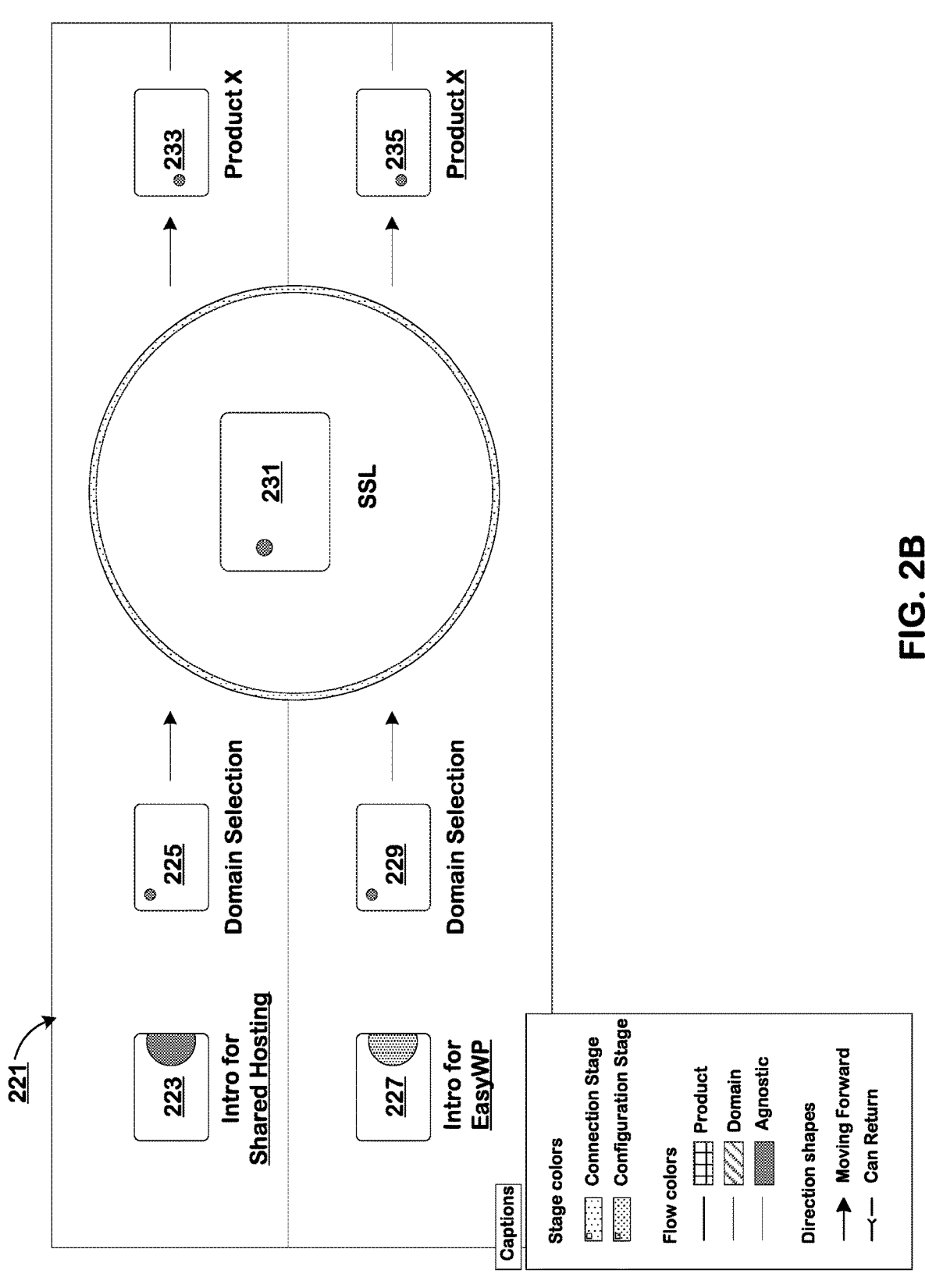

FIGS. 2A and 2B present an example of selection of Internet service products for connecting to a domain. The Internet service products need to be connected to a domain Therefore, domain selection is an important operation in the un-packaging of the Internet service products. The un-packaging (or unboxing) process requires selection of a domain. The selected domain is then used in the following operations to connect and configure Internet service products. FIG. 2A presents a high-level flow 201 in which the process starts with selection of a product X (operation 205). The auto-installation engine 165 prompts the user to select a domain for connecting the product (operation 210). Once a domain is selected, the process continues by adding Internet service products, one by one as shown in operations 215 and 220.

FIG. 2B presents another process flow 221 illustrating selecting and connection of Internet service products to a domain. The example shows initiation of un-packaging process using different Internet service products (e.g., Shared Hosting and EasyWP). Suppose a user selects the Shared Hosting Internet service product for un-packaging. The process starts with the selection of the Shared Hosting Internet service product (operation 223). The auto-installation engine 165 prompts the users to select a domain for connecting the Internet service product (i.e., Shared Hosting) at an operation 225. The auto-installation engine 165 connects the selected domain to Shared Hosting product. The process then continues with selection and connection of further Internet service products to the domain. For example, the auto-installation engine 165 automatically selects "SSL" as a next Internet service product at an operation 231. The un-packaging process continues with another Internet service product at an operation 233. The user can select further Internet service products, if required. FIG. 2B presents another flow in which the un-packaging starts with a different Internet service product at an operation 227. The un-packaging in this flow starts with EasyWP™ product. The auto-installation engine 165 prompts the users to select a domain for connecting the Internet service product (i.e., EasyWP™) at an operation 229. The auto-installation engine 165 connects the selected domain to EasyWP™ product. The process then continues with selection and connection of further Internet service products to the domain. The auto-installation engine 165 automatically selects "SSL" as a next Internet service product at the operation 231. The un-packaging process continues with another Internet service product at an operation 235. The user can select further Internet service products, if required. FIG. 2B also presents the notion of modularity as implemented by the technology disclosed. Because of modularity the technology disclosed can handle connection of different products and different versions of same products using the same connection steps. The illustration 221 shows that the same connection process step for SSL can be applied when connecting different products to domains.

Figure 9A:
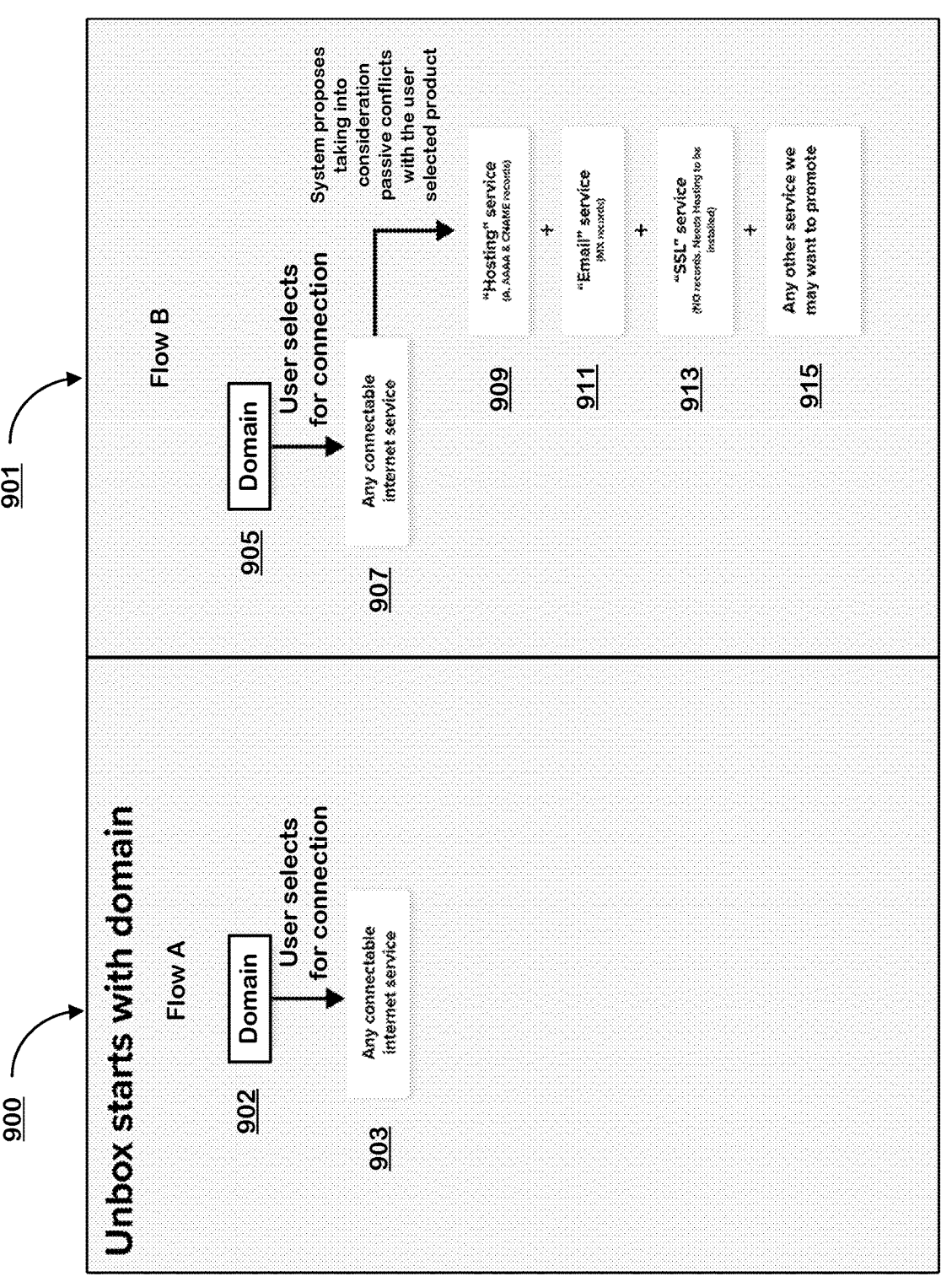
FIGS. 9A, 9B, 9C, 9D, 9E, 9F, 9G and 9H present examples of process flows in which Internet service products are connected to domains.
Figure 9B:
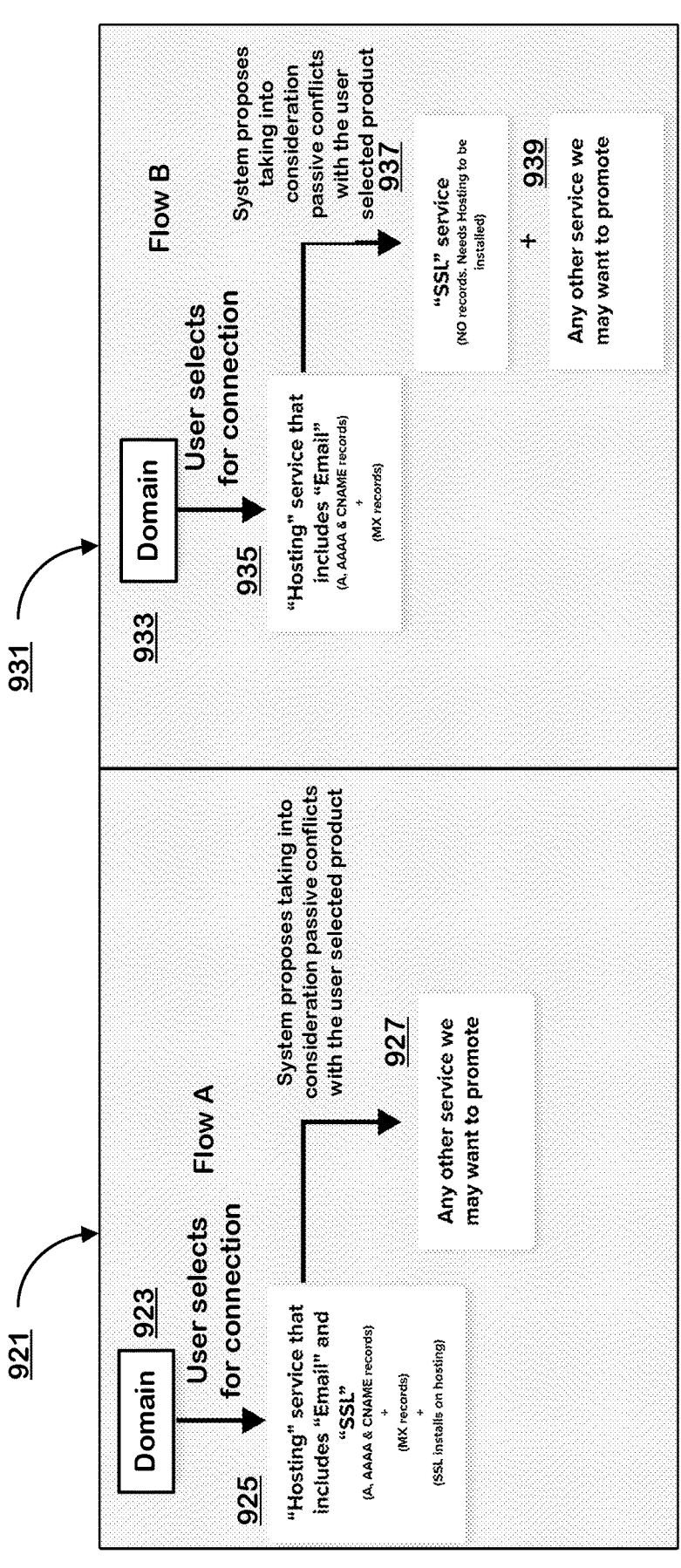
Figure 9C:
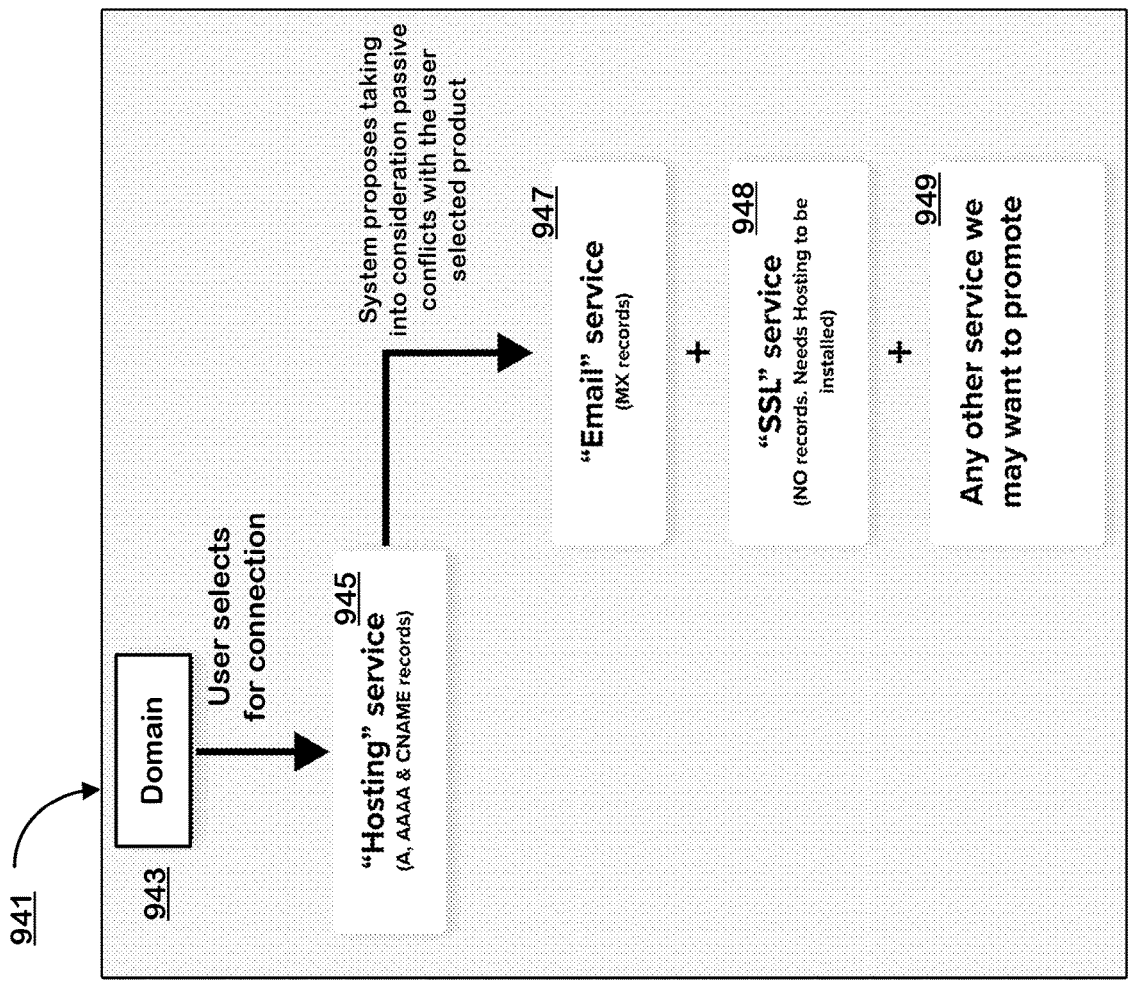
Figure 9D:
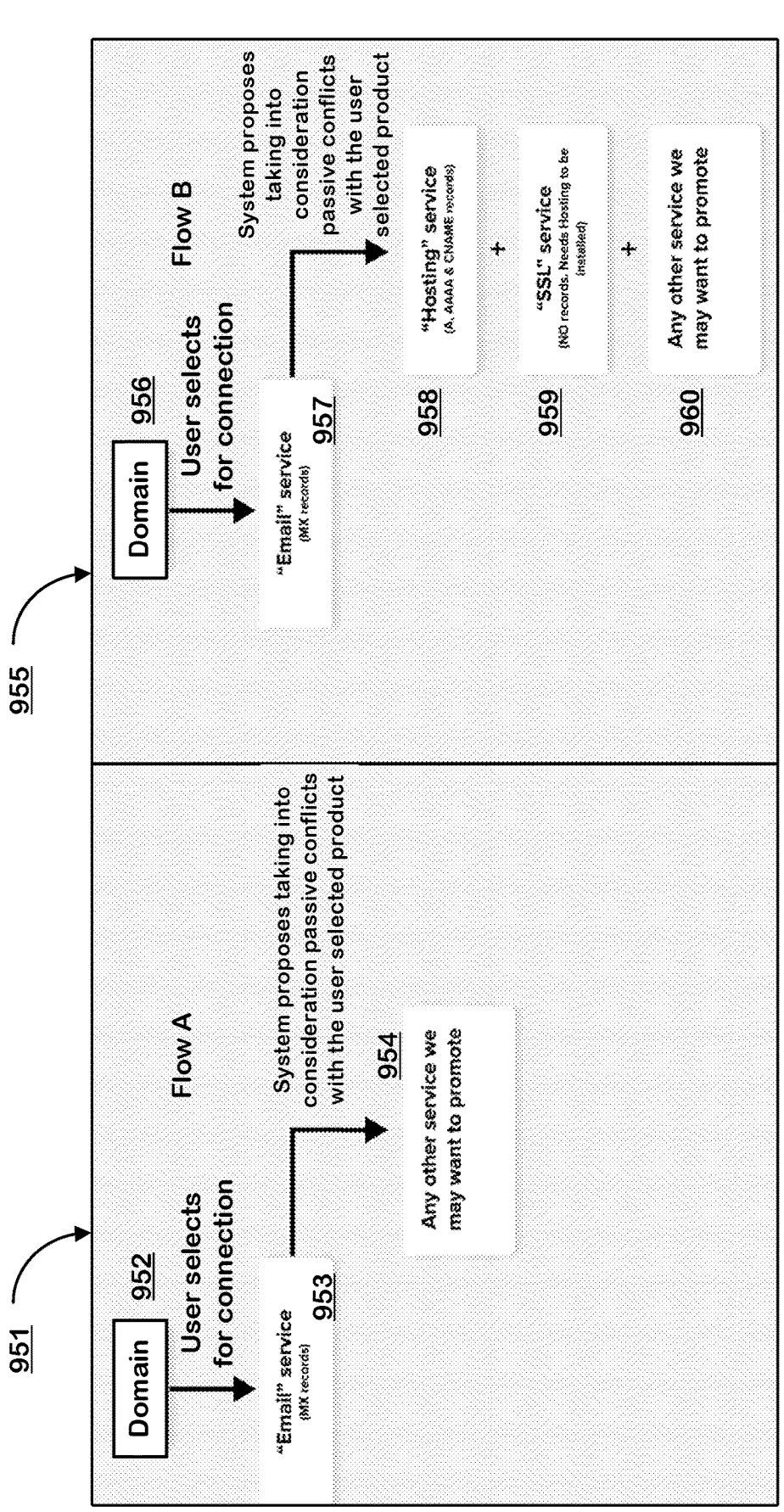
Figure 9E:
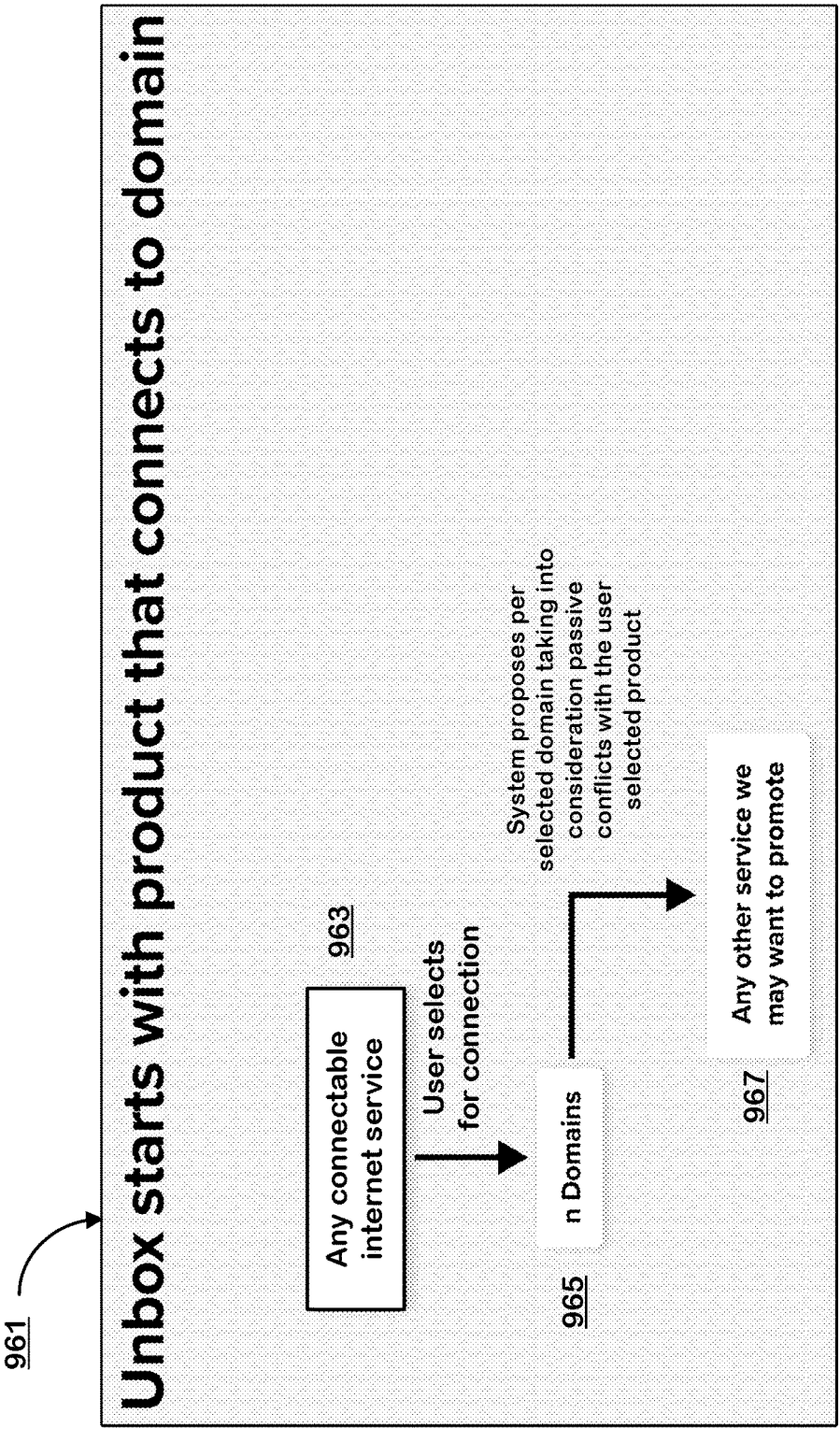
Figure 9F:
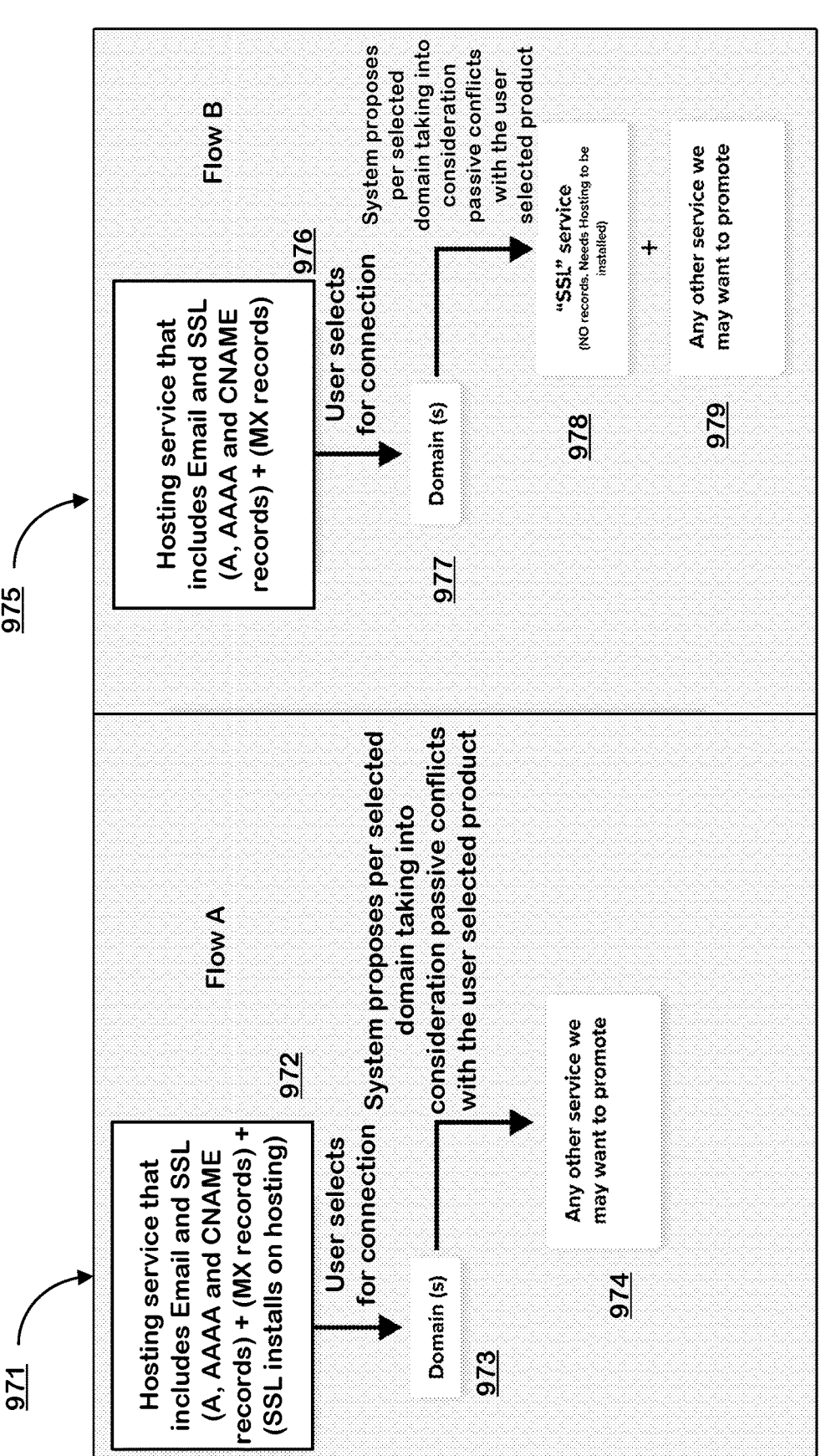
Figure 9G:
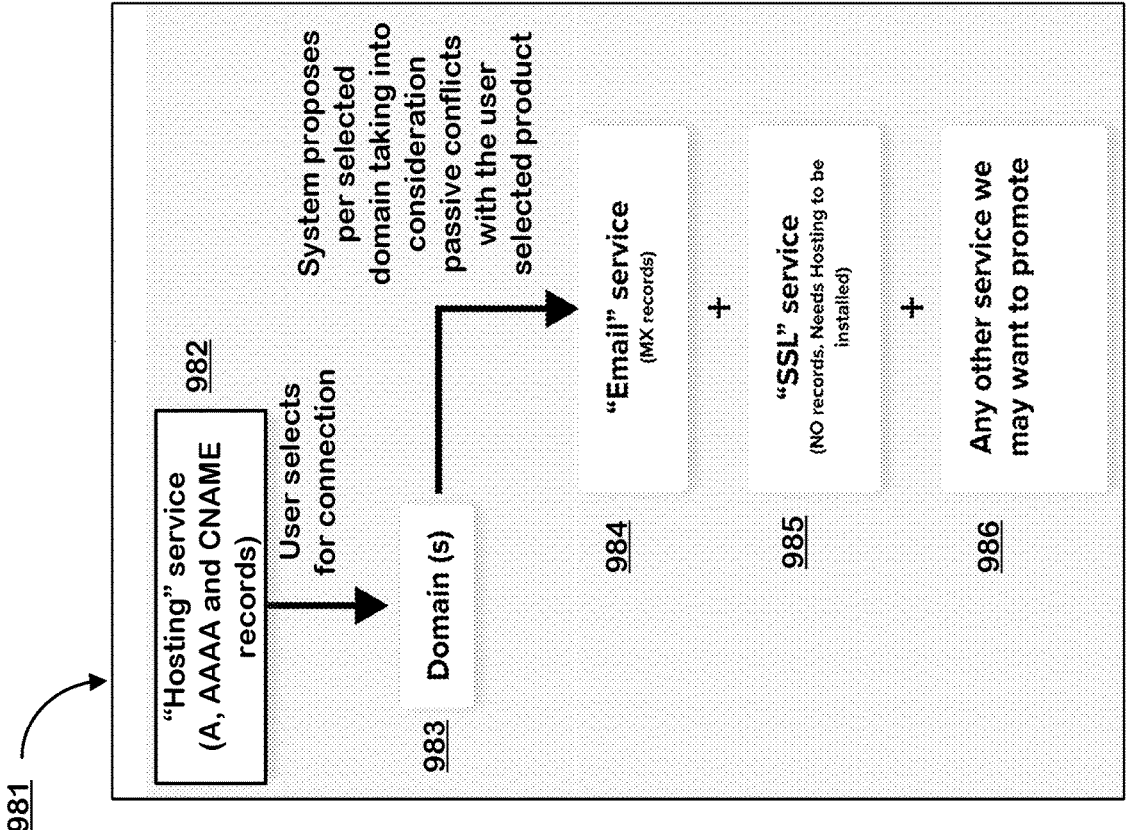

FIGS. 9A to 9H present various examples of process flow of un-packaging Internet service products. FIGS. 9A to 9D and 9H present examples of un-packaging (or unboxing) when the process starts with selection of a domain FIGS. 9E to 9G present examples when un-packaging starts with an Internet service product to connect to a domain FIG. 9H also presents logic implemented in the library 1131 when Internet service products are selected for connection to a domain FIGS. 9A to 9H illustrate how the technology disclosed makes decisions regarding which products to propose to users for connection during the unpackaging (or unboxing process). For example, if the main product being connected to the domain, or unboxed, includes all records (as shown by flow 921 in FIG. 9B) then the system may only propose for that domain any other services that do not need those records. On the other hand, if the main product being connected to the domain or unboxed does not need any record (as shown by flow 901 in FIG. 9A) then all product categories may be proposed to the user. The technology disclosed may include additional logic when proposing and/or selecting a product for connection.

FIG. 9A presents two process flows (flow A labeled as 900 and flow B labeled as 901) presenting process steps for connecting Internet service products to a domain using the technology disclosed. The process flow A (900) starts with selection of a domain (operation 902). The user can select any connectable Internet service product from the library for connecting to the selected domain (operation 903). The process flow B (901) starts with selection of a domain (operation 905). A user can select any Internet service product from the library for connecting to the domain (operation 907). The process flow shows examples of products that may be proposed to the user in the following process operations. A "hosting" Internet service product is proposed for connecting to the domain in operation 909. The hosting service product category can include various hosting Internet service products, e.g., Shared Hosting, Virtual Private Server (or VPS), Dedicated Servers, App-based hosting services, etc. The App-based hosting services can be provided for hosting products including at least one of a WordPress™ product and a Drupal™ product. The hosting Internet service can include "A", "AAAA" and "CNAME" type DNS records. An email service is proposed for connecting to the domain in an operation 911. The email service product category can include various types of email Internet service products, e.g., a cloud-based email product, a web-based email product and an endpoint to endpoint encrypted email product. The email service can include "MX" type DNS record. An "SSL" (secured socket layer) Internet service product is proposed for connecting to the domain in an operation 913. The SSL service may not include any DNS records but requires a hosting Internet service connected to the domain as a pre-requisite. The security service product category can include a SSL product. The SSL product comprises data that defines connection of the SSL product to the domain. The technology disclosed includes logic to detect conflicts between Internet service products that are already connected to the domain and any new products that are selected for connection to the domain during the unpackaging process. The process presented in process flow B (901) can continue at an operation 915. For example, the user can select a communication Internet service product that can be used to communicate between two domains. The communications can be conducted using text messages, audio calls or video-based calls. When a user selects this service, the technology disclosed can include proprietary DNS records to the domain. These records can be used to establish connection with other domains for text, audio and/or video-based communication. The communications service product category can include at least a voice communication product, a data communication product and a video communication product. The voice communication product, the data communication product and the video communication product can establish link to the domain using proprietary domain name server records including the domain as an identifier.

FIG. 9B presents two process flows in which the Internet service products are connected to a domain. The process flow 921 labeled as flow A starts with selection of a domain (operation 923) for connecting the Internet service products. The process continues when the user selects connection of a hosting service to the domain (operation 925). In this case, the hosting Internet service already includes an email Internet service product and an SSL Internet service product that are connected to the hosting Internet service. The hosting Internet service product includes "A", "AAAA" and "CNAME" type DNS records, the email Internet service product includes "MX" type DNS record and the SSL Internet service product is installed on the hosting Internet service product. The auto-installation engine 165 can recommend any additional Internet service products for connecting to the domain (operation 927). When recommending Internet service products, the auto-installation engine 165 uses the conflict detection logic to avoid possible conflicts between a new Internet service product and existing connected Internet service products. It is, however, possible, for the user to select another Internet service product that is not recommended by the auto-installation engine 165. For example, a user can select another email Internet service product for connecting to the domain. The technology disclosed can invoke conflict resolution logic presented above to resolve possible conflict between the existing email Internet service product connected to the domain the new email Internet service product by invoking the conflict resolution logic presented above. A second process flow 931 (labeled as flow B) in FIG. 9B presents a process flow for connecting Internet service products to a domain. The process starts with selection of a domain (operation 933) for connecting the Internet service products. The user then selects a hosting Internet service product for connecting to the domain (operation 935). The hosting Internet service product also includes an email Internet service product. The auto-installation engine 165 recommends additional Internet service products for connection to the domain in the following operations. The user selects an SSL Internet service product for connection to the domain (operation 937). The auto-installation engine 165 can recommend any additional Internet service products for connecting to the domain (operation 939).

FIG. 9C presents a process flow 941 in which Internet service products are connected to a domain. The process starts when a user selects a domain for connecting Internet service products (operation 943). The auto-installation engine 165 recommends Internet service products for connecting to the domain. At an operation 945, the user selects a hosting Internet service product for connecting to the domain. The hosting Internet service includes "A", "AAAA" and "CNAME" type DNS records. The auto-installation engine 165 then recommends further Internet service products for connecting to the domain. At an operation 947, the user selects an email Internet service product for connecting to the domain. The email Internet service product includes "MX" type DNS record. The user then selects an SSL Internet service product for connecting to the domain (operation 948). The auto-installation engine 165 recommends any additional Internet service products for connecting to the domain (operation 949).

FIG. 9D presents two process flows, i.e., flow A (951) and flow B (955) that present examples of two process flows for connecting Internet service products to a domain. The process flow 951 labeled as flow A starts with selection of a domain (operation 952). The auto-installation engine 165 recommends Internet service products for connecting to the domain. At an operation 953, the user selects an email Internet service product for connection to the domain. The auto-installation engine 165 then recommends further Internet service products for connection to the domain. The user can select any additional Internet service products for connection to the domain (operation 954). The process flow 955 labeled as flow B starts with selection of a domain (operation 956). The auto-installation engine 165 recommends additional Internet service products for connecting to the domain. The user selects email service for connecting to the domain (operation 957). The auto-installation engine 165 can then suggest additional Internet service products for connection to the domain. At an operation 958, a hosting Internet service is connected to the domain. The process of adding Internet services to the domain continues and the user adds the Internet service products as suggested by the auto-installation engine 165. An SSL Internet service products is added at an operation 959. Additional Internet service products can be connected to the domain (operation 960).

FIG. 9E presents a process flow 961 that initiates un-packaging or unboxing process using an Internet service product (operation 963). The un-packaging logic of the auto-installation engine 165 prompts the user to select one or more domain for connecting the Internet service product (operation 965). The process flow then continues in which the auto-installation engine 165 prompts the user to select Internet service products for connecting to each selected domain (operation 967).

FIG. 9F presents two process flows, labeled as 972 and 975, that illustrate unpackaging of Internet service products starting with Internet service products. Process flow 971 (also labeled as flow A) starts with a package of three Internet service products including a hosting Internet service product, an email Internet service product and a SSL Internet service product. An Internet service product can include its respective DNS records such as the hosting Internet service product includes "A", "AAAA" and "CNAME" type DNS records, the email Internet service product includes "MX" type DNS record. The SSL Internet service product is installed on the hosting Internet service product. The auto-installation engine 165 prompts the user to select one or more domains to connect the selected products in the previous operation (operation 973). The process then continues allowing the user to select additional Internet service products (operation 974). The second process flow 975 in FIG. 9F presents operations when the un-packaging starts with a package comprising two Internet service products including a hosting Internet service product that includes an email Internet service product (operation 976). The Internet service products can include their respective DNS records such as the hosting Internet service product includes "A", "AAAA" and "CNAME" type DNS records, the email Internet service product includes "MX" type DNS record. The auto-installation engine 165 prompts the user to select one or more domains to connect the selected products in the previous operation (operation 977). The user can select one or more domains to connect the Internet service products. The process then continues allowing the user to select more Internet service products. The user selects a SSL Internet service product for connecting to the selected domains (978). The SSL Internet service product is installed on the hosting Internet service product. The process then continues allowing the user to select additional Internet service products (operation 979).

FIG. 9G presents a process flow 981 that illustrates the un-packaging process starting from one Internet service product. The process starts with a hosting Internet service product (operation 982). The auto-installation engine 165 prompts the user to select one or more domains for connecting the Internet service products (operation 983). The process then continues upon connection of one or more selected domains with the hosting service. In the following operations, the user can select Internet service products, one-by-one, for connecting to the domain. The user selects email Internet service product in an operation 984. The email Internet service product includes "MX" type DNS record. The auto-installation engine 165 prompts the user to select one or more additional products to connect to the domain. The user then selects SSL Internet service product for connecting to the domain (operation 985). The user can select additional Internet service products to connect to the domain (operation 986).

Figure 9H:
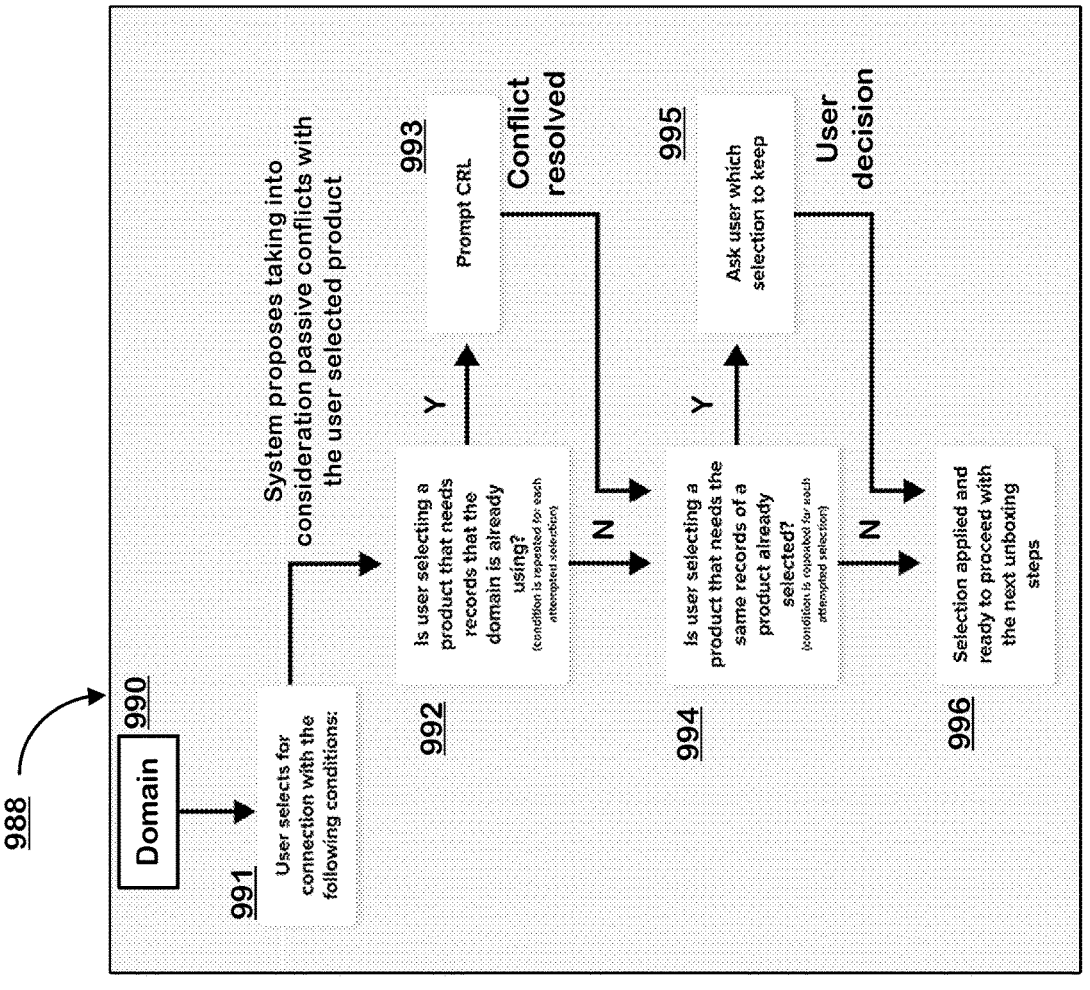

FIG. 9H presents a process flow 988 that illustrates the un-packaging process starting from a domain selection. The process starts with selection of a domain (operation 990). The auto-installation engine 165 prompts the user to select one or more Internet service products (operation 991). The following operations are performed by the auto-installation engine 165 to prompt suitable Internet service products to the user for selection. The auto-installation engine 165 checks whether the user has selected an Internet service product that needs DNS records that the domain is already using (operation 992). This conditional check is performed by the auto-installation engine 165 every time an Internet service product is selected by a user for connecting with a domain. The auto-installation engine sends a request to the conflict resolution layer (CRL) to determine if the selected Internet service product requires resource records (also referred to as DNS records) that the domain is already using. The conflict resolution layer (or CRL) includes logic to process this request as a potential conflict detection and perform next operations accordingly. The conflict resolution layer can include conflict detection and conflict resolution logic as described below. The CRL can send the response to the auto-installation engine 165 whether the selected Internet service product is a valid selection in view of the results of conflict detection process. If a conflict is detected, the process continues at an operation 994 upon resolution of the conflict. If no conflict is detected in operation 992, the process continues at the next operation 994 without invoking the conflict detection and conflict resolution logic in operation 993. At the operation 994, the auto-installation engine 165 checks whether the Internet service product selected by the user needs the same DNS records of another product that is already selected for connecting to the domain. This conditional check (also referred to as selection validation) is performed by the auto-installation engine 165 every time an Internet service product is selected by a user for connecting with a domain. If the auto-installation engine determines that the selected Internet service product requires same DNS records that are already used by another product selected for connecting to the domain then the technology disclosed includes logic to prompt the user to select one of the two products, i.e., newly selected Internet service product or the already connected Internet service product to the domain (operation 995). Therefore, the technology disclosed can proactively detect any potential conflicts that can arise when the two or more selected products are selected for connection to the domain. For example, if a user selects two different email products for connecting to the domain. The auto-installation engine 165 can detect the potential conflict and provide an option to the user to select one of the two selected email products to avoid future conflicts. The technology disclosed can therefore detect conflicts prior to connecting of the Internet service products to domains by analyzing the selected Internet service products. The process then continues at an operation 996, upon receiving the selection from the user. If it is determined at the operation 994 that the newly selected product does not require any of the records required by another Internet service product selected for connecting to the domain, then the process continues from operation 994 to operation 996 without invoking the operation 995. At the operation 996, the auto-installation engine 165 applies the selections received from the user and completes connection of the new product to the domain. The operations 991 to 996 are repeated for every new Internet product selected by a user for connecting to the domain. Further details of resource records are presented in the following section.

Resource Records

Examples of a few selected resource record types as presented in a table 305 in FIG. 3A. The canonical name (CNAME) resource record creates an alias (synonymous name) for the specified DNS domain name. The CNAME records can hide implementation details of the network from clients that connect with it. For example, suppose we want to put an FTP (file transfer protocol) server named "ftp1.example.com" on our domain "example.com" and suppose we know that we will move the FTP server to another computer named ftp2 in the future, but we do not want the users of our domain to know about this change. We can create an alias called "ftp.example.com" and point it to "ftp1.example.com". When we move our FTP server to the new computer, we can change the CNAME record to point to "ftp2.example.com". The CNAME record for the above example is shown below:

ftp.example.com IN CNAME ftp1.example.com

The "IN" attribute indicates a network protocol used to locate and connect to computers on the network. Transmission Control Protocol/Internet Protocol or TCP/IP is commonly used for this purpose.

The second example of resource records in table 305 is an address record or "A" record. The A resource record maps the DNS domain name to a 32-bit IPv4 IP address. For example, the following "A" resource record maps the domain name of the server to its IP address:

example.com IN A 172.16.27.1

The third example of resource records in the table 305 is an "AAAA" resource record. This is an address record that maps a host to its 128-bit IPv6 address.

The fourth example of resource records in table 305 is a mail exchange (MX) resource record. The MX resource record specifies a mail exchange server for a DNS domain name. A mail exchange server is a host that will either process or forward mail for the DNS domain name. Processing the mail means either delivering it to the addressee or passing it to a different type of mail transport. Forwarding the mail means sending it to its final destination server, sending it using Simple Mail Transfer Protocol (SMTP) to another mail exchange server that is closer to the final destination, or queuing it for a specified amount of time. An example of an MX record is presented below:

example.com IN MX mailserver.example.com

The first three fields in the above MX resource record example identify the DNS domain name (example.com), class (IN) and type (MX). The last field is the address of the mail exchange server associated with the DNS domain Note that additional attributes may be included in the example resource records presented above. We have presented some of the attributes for each resource record type as examples for illustration purposes. We present further examples of resource records in the following text to illustrate conflict detection.

Example of Conflicting and Non-Conflicting Resource Records

Examples of conflicts that can occur due to new resource records established by a requested service (or a new service) are presented below. The conflicts can occur due to different reasons. For example, a new service can be established by a different type of resource record than an existing service in the package of services. However, these two resource records can cause a conflict as shown in case 1 (FIG. 3B). In case 2 (FIG. 3C) we present another scenario in which two different services are established by the same type of records with different values thus causing conflict.

FIG. 3B presents an example 310 of conflict between a requested Internet service product and package of Internet services associated with a domain Consider a domain "example.com" that has one or more Internet services in a package of services associated with it. The domain comprises resource records corresponding to these services associated with it. An example resource record 312, is shown in FIG. 3B. A service identifier is included in the resource records to indicate the service established by the resource record. For example, the resource record 312 is related to service with a service identifier "1". Three attributes of the resource record 312 are shown for illustration purposes in the payload portion. The attributes indicate that the name of the host computer is "@" which is also referred to as root host. The record type is "A" which is 32-bit IPv4 address of the host. The value of the address is "72.3.2.1". Note that these values are presented as examples for illustration purposes only. Further consider that the owner or administrator of the domain "example.com" starts integrating the domain with a second Internet service (serviceId=2) that is established by a resource record 314. The technology disclosed detects a conflict between the package of services associated with the domain, although the two resource records 312 and 314 are of different types.

The technology disclosed compares the attributes of resource records 312 and 314 and determines that conflict exists between "A" and "AAAA" resource records as both records are attempting to set two different values for the same host "@". The conflict detector determines that if requested Internet service is connected to the domain and resource record 314 is associated with the domain then existing Internet service with a resource record 312 will not be available for use with the domain. As a result, the clients can experience a disruption of services provided by the domain. The technology disclosed can present one of the conflict resolution options to the client or automatically apply one of the conflict resolution options.

FIG. 3C illustrates another example of conflicting records. In this case the existing service (serviceId=1) is established by an "A" type resource record 317. A new service (serviceId=2) is connected to the domain and is established by a resource record 319. The resource record 319 is also an "A" type resource record. In this example, a conflict is detected between a new service and an existing service due to the same type ("A") of resource records associated with the two services. The resource record 319 is attempting to set a new value for "A" type record for the host thus causing the conflict. The technology disclosed will detect the conflict and automatically resolve the conflict or present resolution options to the domain administrator or owner.

In the following two examples presented in FIGS. 3D and 3E, we present examples of non-conflicting resource records. FIG. 3D illustrates an example 320 of non-conflicting records of different types. Note that in this example, the existing resource record 322 includes an "A" type resource record for a subdomain "blog.example.com" of the "example.com" domain. When the owner or the administrator starts integrating a new Internet service with the domain "example.com", the requested Internet service sets a resource record 324. The resource record 324 is an "AAAA" type record however, it sets the value for the root ("example.com") and not the subdomain "blog.example.com". The conflict detection logic determines that the two resource records 322 and 324 are assigned to different domains therefore after integration of the requested Internet service both Internet services will be available. Thus, no conflict is detected, and the domain administrator is allowed to connect the requested Internet service with the domain.

FIG. 3E presents another example 330 of non-conflicting resource records. In this example, the existing resource record 332 associated with the domain "example.com" is of record type "A". The administrator of the domain requests a new mail service for the domain. The requested Internet service sets a resource record of type "MX". The "A" record sets a 32-bit IPv4 address for the host. The "MX" record sets a value of the mail exchange server associated with the domain Both resource records are associated to the root host ("example.com"). However, the two resource records are related to different types of Internet services and have no conflict between them. The conflict detection logic determines that there is no conflict between the existing resource record 332 and the resource record 334 for the requested Internet service.

Partial Conflict Resolution

The technology disclosed can also resolve partial conflicts between requested Internet service and the package of Internet services. There are cases when complex Internet services can be associated with a domain. Such complex Internet services can comprise of more than one services. For example, an Internet service can include email service, website builder plugins, calendar features, contact management features, disk storage, etc. Each one of the constituent services in the complex Internet service can set multiple resource records associated with the domain. A requested Internet service may conflict with one or few of the services in the group of services in the complex Internet service associated with the domain Manual resolution of such conflicts can result in removal of the entire group of Internet services even if the conflict of the requested service is with one of the services in the group of services. The technology disclosed can apply partial conflict detection to detect the service in the group of Internet services with which the requested Internet service conflicts. The technology disclosed can assign product or service identifiers to services in the group of services. These identifiers can identify a product type or service type for the Internet service in the group of Internet services. The technology disclosed includes logic to resolve the conflict by removing or disabling Internet services in the group belonging to a particular product type or service type when at least one attribute of at least one service in that product type or service type conflicts with at least one attribute of the requested Internet service. Services belonging to non-conflicting product type or service type are not removed from the package of services associated with the domain.

Example of Partial Conflict Resolution

FIG. 4 presents an example of partial conflict detection and resolution. A table 401 lists some of the existing resource records associated with the domain. The table shows a resource record type for each entry in the table, the host name, a value for the resource record, a connection identifier and a group identifier (groupID). The group identifier is the product type or service type as described above and identifies the product group or service group with which the record is associated. For example, the first resource record in the table 401 is related to the "web" product type. The second and third resource records are related to "email" service and the fourth resource record is of "system" service type. A table 411 shows resource records for the requested Internet service. The requested service is an email service as indicated by the record type field "MX" in the first column. The technology disclosed includes logic to determine a service or product type of the requested Internet service by matching the new resource record in table 411 with existing resource records in table 401. The logic results in match of the new resource record with the third resource record in the table 401 due to match of type field values "MX" in both records. The conflict detection logic, then identifies the service type or product type of the conflicting record by querying the groupID field. The query result indicates that the conflicting service type is an "email" service. The conflict resolution logic, therefore, removes the resource records belonging to the email service type in table 401 and includes the resource record for the requested Internet service. The resulting table 421 lists the updated resource records after inclusion of requested Internet service and removal of the conflicting email service in the package of services associated with the domain.

We now present process flowcharts illustrating the conflict detection and conflict resolution process steps. The logic can be implemented using processors programmed using computer programs stored in memory accessible to the digital collaborative workspace system and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow chart herein shows only steps that are pertinent to an understanding of the invention, and it will be understood that numerous additional steps for accomplishing other functions can be performed before, after and between those shown.

Conflict Detection—Process Flowchart

Figure 5:
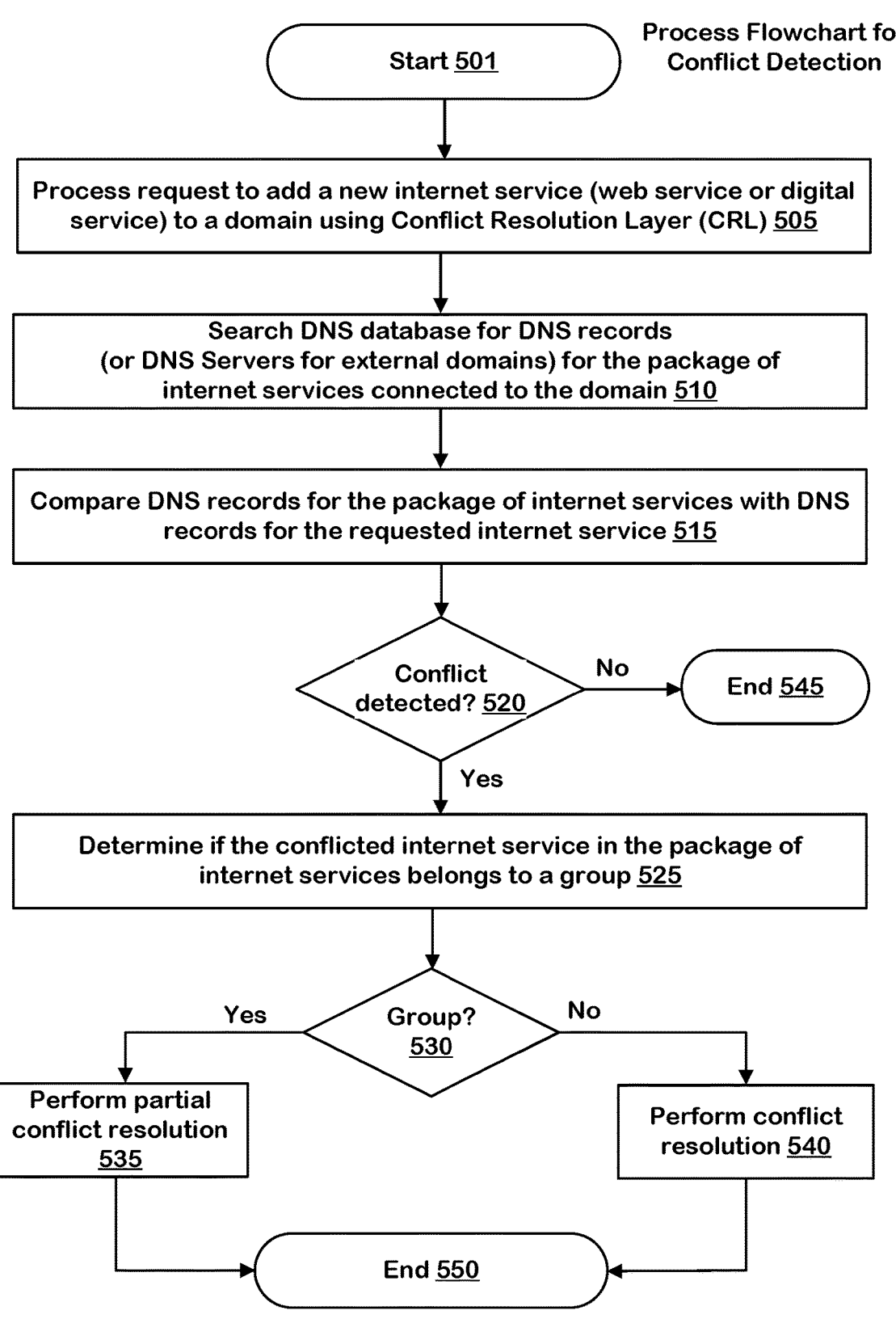
FIG. 5 is a process flowchart presenting process steps for conflict detection.

FIG. 5 presents conflict detection process in flowchart 500. The process starts at a step 501. At a step 505 the system processes a request to add a new Internet service to a domain. The system applies conflict detector 150 to detect conflict between the requested Internet service and the package of Internet services associated with the domain. In one implementation, the conflict detection logic is implemented in conflict resolution layer. At a step 510, the system searches DNS databases for DNS records. If the DNS domain is maintained by an external server, the system includes logic to search DNS servers for external domains. As a result of this search the system receives resource records associated with the domain. At a step 515, the process includes comparing the DNS resource records for the package of Internet services associated with the domain with the resource records of the requested Internet service. If no conflict is detected at a step 520, the process ends at a step 545. Otherwise, if a conflict is detected at a step 520, the process continues at a step 525. The process includes determining whether the conflicting Internet service in the package of Internet services belongs to a service type or product type group. If the conflicted service in the package of services belongs of a service type or product type group (step 530), the process continues at a step 535 to perform partial conflict resolution 535. Otherwise, the process continues at a step 540 to perform conflict resolution. The process ends at a step 550.

Conflict Resolution—Process Flowchart

FIG. 6 presents conflict resolution process flowchart 600. The process starts at a step 601. At a step 605, the process determines if there exists an alternate Internet service in the package of Internet services that can be used in place of the requested Internet service. If a service exists (step 610) in the package of Internet services, then the process continues at a step 615 and selects alternate Internet service in the package of services. The conflict resolution logic in this resolution option does not add the requested Internet service to the package of Internet services.

If the conflict resolution logic determines that an alternative to the requested Internet service does not exist in the package of services then the process requests the domain administrator to select the requested service (620) and presents the service that will be disconnected from the package of Internet services to resolve the conflict with the requested service (step 625). The process continues to step 640 in which the system applies the selected resolution option and updates the resource records of the package of Internet services associated with the domain.

The system can also present a third resolution option by invoking a custom conflict resolution widget or application (step 630). The process includes determining custom resolution options (such as selection of a subdomain, increasing capacity of shared hosting, etc.) and presenting the options to a user to get selection (635). The input is received from the domain administrator (or the user) to apply the selected resolution option and update DNS records to the package of Internet services at a step (635). The custom resolution options include selection of a subdomain, increasing the capacity of the shared hosting, etc. The process continues at a step 640 in which the system applies the selected resolution option and updates the resource records of the package of Internet services associated with the domain.

The custom conflict resolution logic can include logic to determine if the conflict is on the domain side or the host side and propose respective conflict resolution options. For example, if the conflict is detected on the domain side, the system can propose using a subdomain to resolve the conflict. For "example.com" domain, examples of subdomains can be "blog.example.com", "shop.example.com", "site.example.com", etc. The administrator can select a subdomain for associating the conflicting requested Internet service. This can resolve the conflict.

If the system detects that a conflict is present on the host side with shared hosting due to no additional capacity for new domain, the system can propose two options for resolving the conflict. The administrator can update the shared hosting plan to increase its capacity. The administrator can also disconnect one of the already connected domains with the host and connect the new domain with the host. Custom resolution can also propose custom conflict resolutions for specific Internet services. The process ends at a step 645.

Sequence of Operations—Conflict Detection and Resolution

Figure 7A:
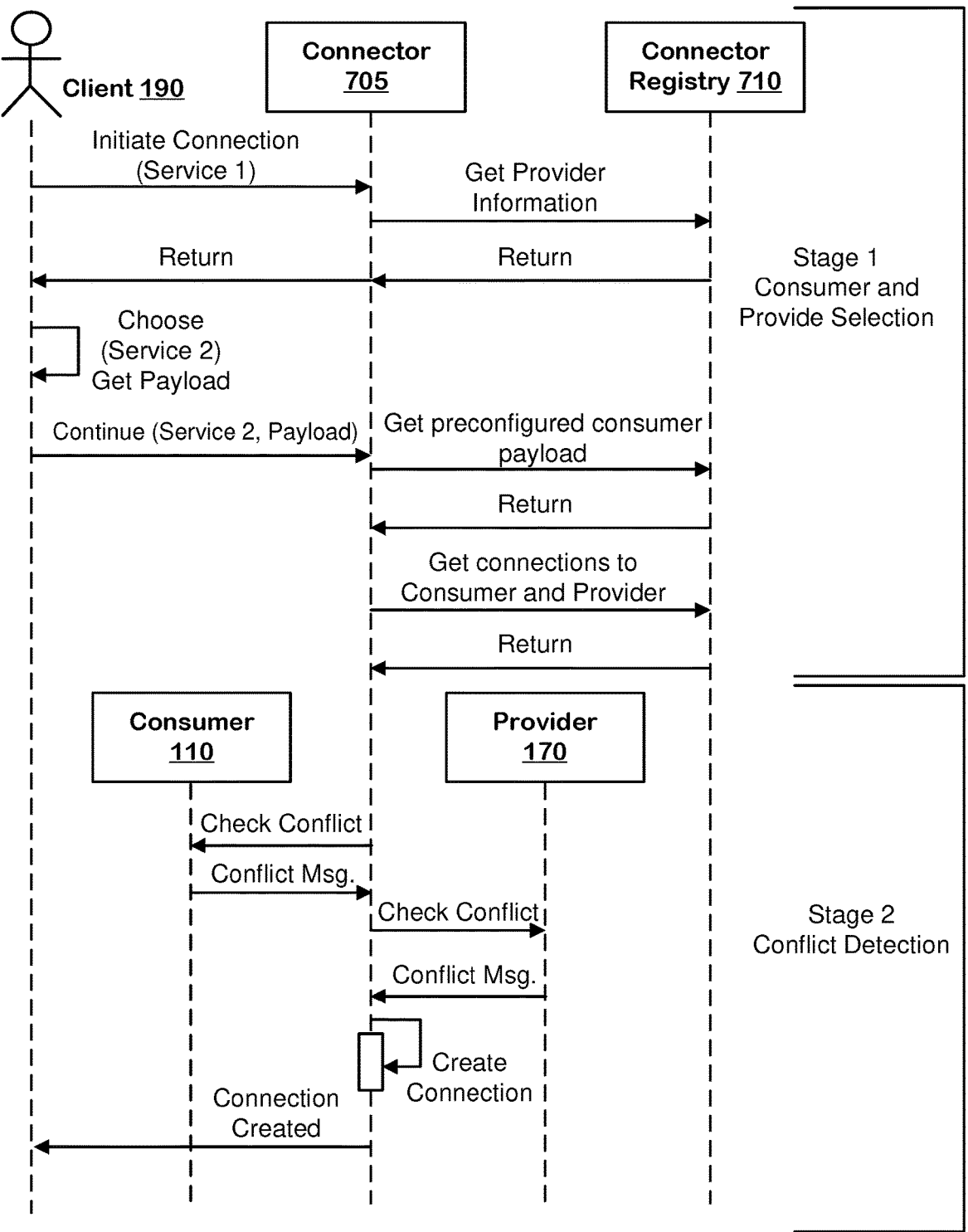
FIG. 7A presents a first sequence diagram illustrating interaction between various actors during first two stages of conflict detection and resolution.
Figure 7B:
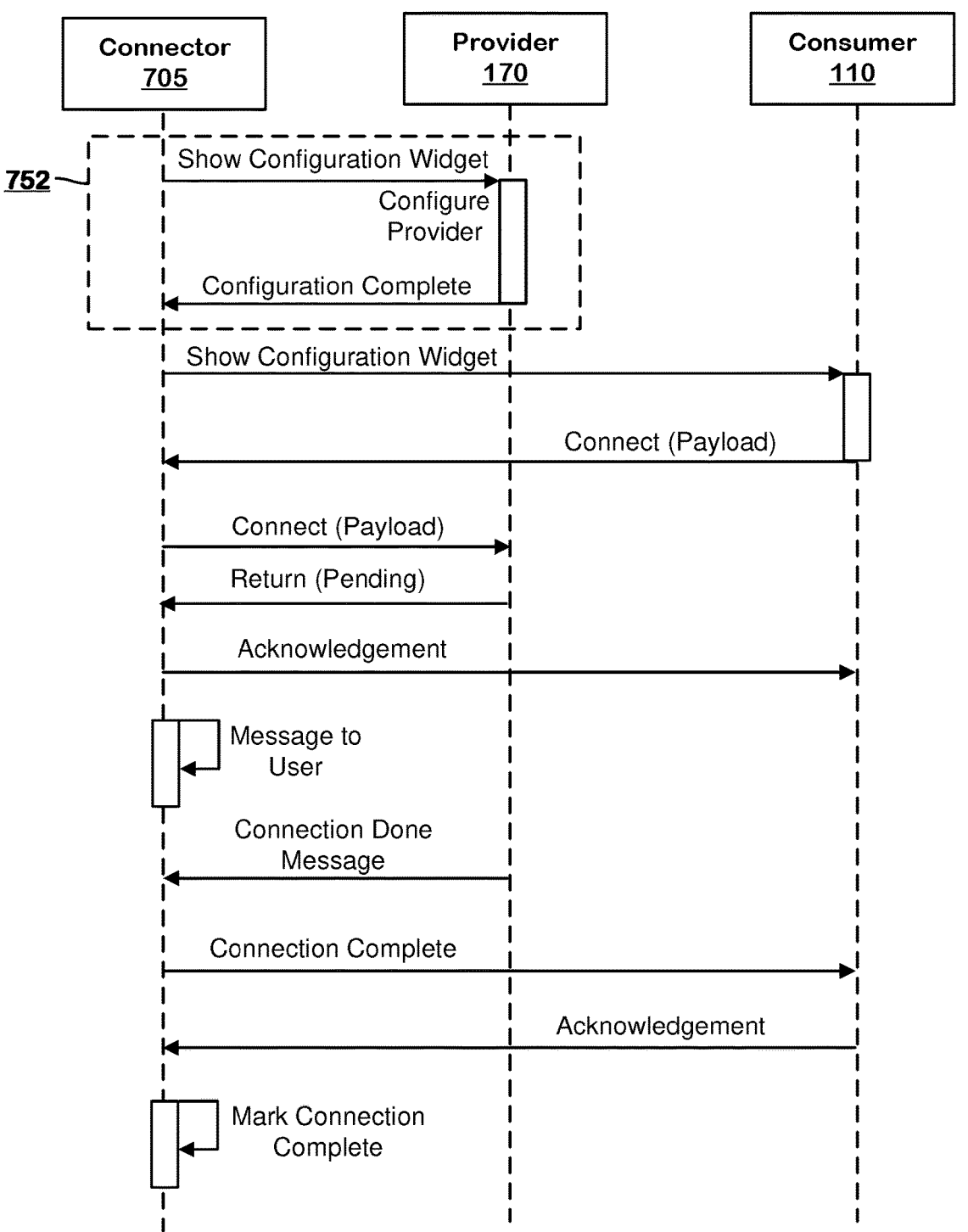
FIG. 7B presents a second sequence diagram illustrating interaction between various actors during the third stage of conflict detection and resolution.
Figure 7C:
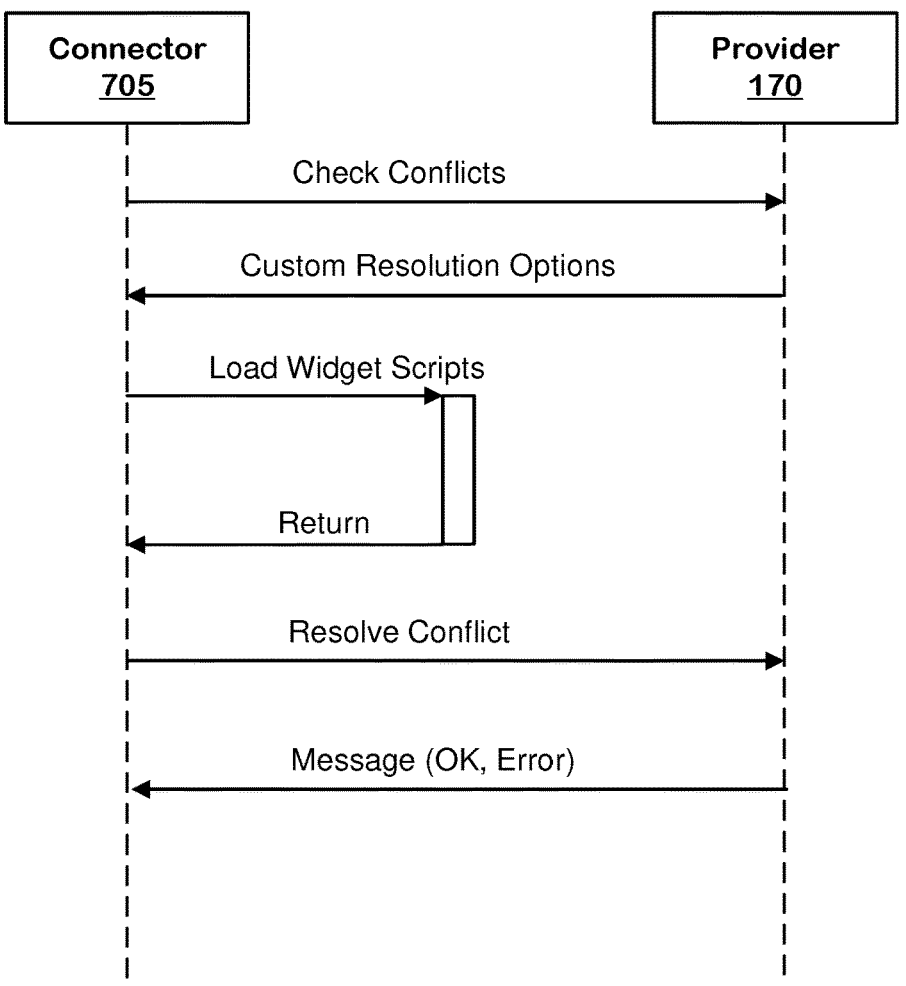
FIG. 7C presents a third sequence diagram for invoking and applying a custom conflict resolution widget.

FIGS. 7A, 7B, and 7C present sequence diagrams for conflict detection and resolution processes.

Actors

FIG. 7A illustrates interaction amongst five actors: a client 190, a connector 705, a connector registry 710, a consumer 110, and a provider 170. As presented above, a client 190 can be an administrator or owner of a DNS domain. The client can interact with the actors using a computing device such as desktop or laptop computers, person digital assistants or a mobile computing devices, etc. The connector 705 is a component of the system that is responsible for creating connection and handling their lifecycle such as disconnection, expiration, etc. The connection registry 710 is a persistent storage (such as database) that stores information about connections and their states. The consumer 110 can be a server or a host that acts as a product or service consumer in the application interaction flow. The provider 170 can be a domain that acts as a product or service provider in the application interaction flow. The DNS domain is an example of the provider 170. An application interaction service (not shown in FIG. 7A) can be responsible for message flow amongst different actors presented above. It is the responsibility of this service to manage Internet service connection. The overall message sequence flow is divided into three stages. Stages 1 and 2 are shown in FIG. 7A. Stage 1 includes selection of consumer and provider. Stage 2 is related to conflict detection.

Stage 1 Message Sequence

We first describe the message flow in stage 1 that includes identification of consumer and provider. The message communication in stage 1 includes three actors: client 190, connector 705 and connector registry 710. The process starts with an "initiate connection" message from client 190 to connector 705. This is followed by "get provider information" message from connector 705 to connector registry 710. The connection registry returns a message with provider information which is forwarded by connector 705 to client 190. The messages listed above identify the first Internet service (service 1). The client 190 then chooses a second Internet service (service 2) and receives the payload. The payload can include attributes and values of resource records for an Internet service or a product as shown above in FIGS. 3A to 4. The client 190 then sends a "continue" message to connector 705 with information about service 2 and can include payload with this message. The connector 705 sends a message to connector registry 710 to "get preconfigured consumer payload". The connector registry 710 sends a return message to the connector. Finally, at the end of stage 1, the connector 705 sends a message to connector registry 710 to "get connections to consumer and provider". These connections are also referred to as "hooks". The connection registry 710 sends this information to connector 705 to complete the stage 1 which is also referred to as discovery stage. This stage determines which Internet services can be connected to the domain. The stage 2 of the process includes conflict detection and resolution.

Stage 2 Message Sequence

The bottom portion of the message sequence diagram 700 (FIG. 7A) presents message sequence flow for conflict detection and resolution. Four actors are involved in this process: client 190, consumer 110, connector 705, and provider 170. The connector 705 sends a "check conflict" message to consumer 110. The message can include provider and payload information. The consumer 110 sends a "conflict message" to the connector 705. The conflict message can indicate if there is a conflict between the selected Internet service and package of services associated with the domain. The connector 705 then creates a new connection in the database and sends a confirmation message to the client 190 after the connection is created.

Stage 3 Message Sequence

FIG. 7B is a message sequence diagram 750 that presents flow of messages in stage 3 of the conflict detection and resolution process. In this stage, the system creates a connection between a consumer and provider in an asynchronous manner. The messages shown in a box 752 are shown in further detail in FIG. 7C. These messages are related to custom resolution of conflicts using a configuration widget. Following the message from connector 705 "show configuration widget", the provider 170 configures the provider. After completing the provider configuration, a message "configuration complete" is sent from provider 170 to connector 705.

The connector 705 sends a show configuration widget message to consumer 110. Following this, the consumer 110 sends a "connect" message to connector 705 that includes payload. The connector 705 then sends a "connect" message to provider 170 with payload. The provider 170 sends a "return" message to the connector 705. Following this, the connector sends an "acknowledgement" message to consumer 110. The connector 705 then displays a "message" (such as "thank you") to the client 190. Following this, the provider 170 sends a "connection done" message to connector 705. The connector 705 sends a "connection complete" message to consumer 110. The consumer 110 sends an "acknowledgement" message to connector 705. Finally, the connector 705 marks the connection as complete.

Custom Conflict Resolution Message Sequence

FIG. 7C presents a message sequence diagram 770 for custom conflict resolution widget. The process starts when connector 705 sends a "check conflicts" message to provider 170. The message can include information about the requested Internet services and the package of Internet services associated with the domain. The provider 170 sends a "custom resolutions options" message to connector 705. Following this, the connector 705 "loads widget scripts", thus initiating the custom conflict resolution widget. The connector 705 then sends a "resolve conflict" message to the provider 170. Finally, the provider 170 sends completion message indicating success (OK) or failure (error) of the custom conflict resolution to the connector 705.

Particular Implementations

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Conflict Detection

A method implementation of the technology disclosed includes detecting conflicts between a requested Internet service and a package of Internet services. The method includes receiving a request from a client to add a requested Internet service to a package of Internet services. The method includes searching a domain name system (DNS) database for DNS records or a DNS server for external domains having attribute fields indicating attributes of the Internet services in the package of Internet services. The method includes comparing attributes of the requested Internet service to attribute fields for the Internet services in the package of Internet services using a set of conflict definitions to identify attributes of the Internet service requested, conflicting with attributes of the package of Internet services. The method invokes a resolution process whenever conflicting attributes are identified.

In some method implementations, resolving the conflict further includes at least initiating a request for a selection from the following three resolution options: (1) the method includes removing a conflicting service from the package Internet services and adding the Internet service requested, (2) the method includes preserving the Internet services in the package and declining the request to add the Internet service, and (3) the method includes using a subdomain instead of a domain included in the request from the client. In some implementations, resolving the conflict further includes at least initiating a custom resolution widget application. In some implementations, the method includes receiving a selection and triggering a further process to implement the selection requested.

Each Internet service in the package can be assigned a group based on service type or product type. Resolving the conflict can further include removing Internet services in the group when at least one attribute of at least one Internet service in the group conflicts with at least one attribute of the requested Internet service. The group of services may be identified by a service type identifier or a product type identifier. In some implementations, all Internet services in the group are removed when one of the Internet services in the group is in conflict.

In some implementations, one or more Internet services can be assigned to a dependent group (such as systems group) of Internet services. The Internet services assigned to the dependent group can exist in the package of Internet services when Internet services assigned to at least one other group are present in the package of Internet services. In such an implementation, the method includes removing all Internet services in the dependent group from the package when conflict resolution process results in removal of all other Internet services from the package of Internet service.

The method includes invoking a lookup process to locate domain names for the Internet services in the package whenever no Internet services are found in the database.

Some method implementations include determining that a payload of the request indicates the request is for a consumer or a provider. Whenever the request is for a consumer, at least initiating a configuration widget appropriate to the consumer and otherwise at least initiating a configuration widget appropriate to the provider. An example Internet service includes a tool for designing a website logo.

In some implementations, conflicting attributes are selected from a set consisting of: an IPv4 address of a domain host, an IPv6 address of a domain host, a canonical name enabling one domain name to map to another domain name, an email server, a name server record for a domain host, and a record containing information for use outside of a DNS server. It is understood that the technology disclosed can detect conflicts for other types of resource records not listed in the above set of examples.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Conflict Resolution

A method implementation of the technology disclosed includes resolving by an applications interaction server, a conflict between a requested Internet service (sent to a domain), requested by an Internet service requesting server (also referred to as host), and a package of Internet services. The method includes, sending to an Internet service requesting server, a conflict check result message indicating a presence of a conflict between a requested Internet service requested by the requesting server and a package of Internet services. The method includes receiving from the Internet service requesting server a response including a selected from (i) an alternate Internet service in the package of Internet services to substitute for the requested Internet service; (ii) a request to replace an existing connection with a service in the package of Internet services with the requested Internet service; and (iii) a request to initiate a custom resolution application pointed on by an address or pointer. The method includes responsively at least initiating, whenever an alternate Internet service has been requested, substituting the alternate Internet service in the package of Internet service for the requested Internet service. Otherwise, whenever a request to replace an existing connection with a service in the package of Internet services with the requested Internet service, disconnecting the existing connection and connecting the requested Internet service and including the connected Internet service in the package of Internet services. Otherwise, whenever a request to initiate a custom resolution, at least initiating invoking the custom resolution application using the address or pointer.

In some implementations, the request to initiate a custom resolution application further includes one or more resolution options. In such implementations, the method further includes passing one or more resolution options to the custom resolution application. One or more resolution options initiated by the custom resolution application further include: detecting whether a conflict type for the conflict is a domain-side conflict or a host-side conflict wherein domain-side conflicts include a resource record conflict and host-side conflicts include a no-capacity conflict, selecting a custom resolution based upon the conflict type detected, and providing the custom resolution to a client. The domain-side conflict further including a private email requested Internet service conflicting with a cloud-based email Internet service in the package of Internet services. The host-side conflict further includes the host not having enough domain slots to connect the requested Internet service to the package of Internet service. The conflict detected includes a resource record conflict. In such implementations, the method further includes using a subdomain instead of a selected one by receiving instructions provided by the Internet service requesting server using API. The conflict detected can include not enough domain slots for additional domains in shared hosting. In such implementations, the method further includes initiating at least one of updating a shared hosting plan to increase capacity; and disconnecting at least one domain already connected and replacing by connecting a new one as requested. In such implementations, the method includes requesting the Internet service requesting server respond with a selection selected from the updating a shared hosting plan to increase capacity; and disconnecting at least one domain already connected and replacing by connecting a new one as requested.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Computer System

Figure 8:
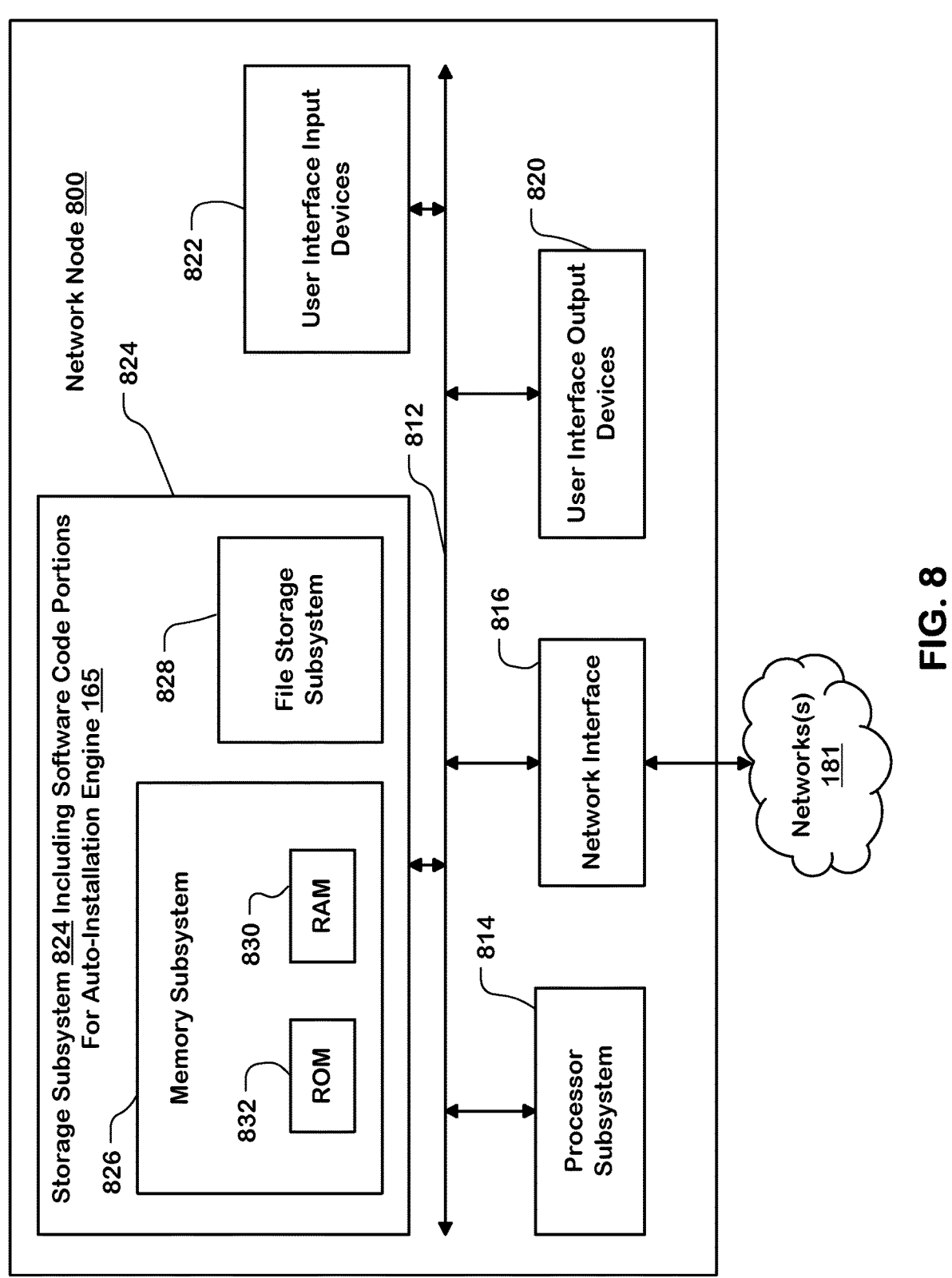
FIG. 8 is a simplified block diagram of a computer system 800 that can be used to implement the conflict detection and conflict resolution system of FIG. 1.

FIG. 8 is a simplified block diagram of a computer system 800 (also referred to as a network node) that can be used to implement the technology disclosed. Computer system 800 includes at least one central processing unit (CPU) as part of the processor subsystem 814 that communicates with a number of peripheral devices via bus subsystem 812. These peripheral devices can include a storage subsystem 824 including, for example, memory devices 826 and a file storage subsystem 828, user interface input devices 822, user interface output devices 820, and a network interface subsystem 816 The input and output devices allow user interaction with computer system 800. Network interface subsystem 816 provides an interface to outside networks, including an interface to corresponding interface devices in other computer systems.

In one implementation, the auto-installation engine 165 of FIG. 1A is communicably linked to the storage subsystem 824 and the user interface input devices 822.

User interface input devices 822 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 800.

User interface output devices 820 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 800 to the user or to another machine or computer system.

Storage subsystem 824 stores programming and data constructs that provide the functionality of some or all of the modules and methods described herein. The computer system can include graphics processing units (GPUs) or field-programmable gate arrays (FPGAs).

Memory subsystem 826 used in the storage subsystem 800 can include a number of memories including a main random access memory (RAM) 830 for storage of instructions and data during program execution and a read only memory (ROM) 832 in which fixed instructions are stored. A file storage subsystem 828 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 828 in the storage subsystem 824, or in other machines accessible by the processor.

Bus subsystem 812 provides a mechanism for letting the various components and subsystems of computer system 800 communicate with each other as intended. Although bus subsystem 812 is shown schematically as a single bus, alternative implementations of the bus subsystem can use multiple busses.

Computer system 800 itself can be of varying types including a personal computer, a portable computer, a workstation, a computer terminal, a network computer, a television, a mainframe, a server farm, a widely-distributed set of loosely networked computers, or any other data processing system or user device. Due to the everchanging nature of computers and networks, the description of computer system 800 depicted in FIG. 8 is intended only as a specific example for purposes of illustrating the preferred embodiments of the present disclosed technology. Many other configurations of computer system 800 are possible having more or less components than the computer system depicted in FIG. 8.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a Big-Table™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and Yahoo! S4™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A server-side implemented method for digitally unpackaging and auto-installing one or more hosted Internet service products from a set of available hosted Internet service products, the method comprising:

receiving a selection of a starting point and determining whether the selected starting point is one selected from (i) a domain and (ii) a hosted Internet service product, if the starting point selected is a domain, then:

for the domain, prompting for and receiving a selection of at least one hosted Internet service product category in a plurality of hosted Internet service product categories;

for each hosted Internet service product category in the selection of the at least one hosted Internet service product category, prompting to receive a selection of a particular hosted Internet service product to connect to the domain until a set of hosted Internet service products is received;

otherwise, if the starting point selected is a hosted Internet service product, then:

for the hosted Internet service product, prompting for and receiving at least one domain to connect to the hosted Internet service product;

for the hosted Internet service product and each domain, prompting for and receiving a selection of at least one other hosted Internet service product belonging to a hosted Internet service product category to connect to the domain from a set of hosted Internet service product categories;

setting up connections between hosted Internet service products selected and configuring the hosted Internet service products selected; and providing the hosted Internet service products selected as configured to an installation process.

2. The method of claim 1, further including, testing the set of hosted Internet service products for conflicts between hosted Internet service product selections in the set of hosted Internet service products, and if conflicts are detected, initiating resolution process to resolve the conflicts detected.

3. The method of claim 2, wherein testing the set of hosted Internet service products for conflicts between product selections in the set of products, and if conflicts are detected initiating resolution process to resolve the conflicts detected further includes:

searching for attribute fields indicating attributes of hosted Internet service products in the set of hosted Internet service products;

comparing attributes of each selected hosted Internet service product in the set of hosted Internet service products to attribute fields of remaining hosted Internet service products in the set of hosted Internet service products using a set of conflict definitions to identify attributes of a selected hosted Internet service product that conflict with attributes of remaining hosted Internet service products in the set of products; and whenever conflicting attributes are identified, invoking a resolution process, wherein the resolution process includes at least initiating a request for a selection from (1) removing a conflicting hosted Internet service product from the set of products and offering to perform adding a substitute hosted Internet service product (2) preserving the hosted Internet service products in the set of products and declining a request to add a hosted Internet service product selected, and (3) using a sub-domain instead of a domain, receiving a selection, and triggering a further process to implement the selection requested.

4. The method of claim 3, wherein searching for attribute fields indicating attributes of hosted Internet service products further includes:

searching domain name system entries for attribute fields indicating attributes of hosted Internet service product in the set of products.

5. The method of claim 1, wherein the configuring the hosted Internet service products selected further includes setting up parameter values for the hosted Internet service products selected.

6. The method of claim 5, wherein configuring hosted Internet service products selected further includes:

outputting, for the particular hosted Internet service product selected, at least one configuration parameter;

receiving a value for the at least one configuration parameter;

updating the particular hosted Internet service product by setting the at least one configuration parameter with the value received.

7. The method of claim 1, wherein the starting point selected is a domain, the prompting for and receiving the selection of at least one hosted Internet service product category further including, determining whether the selection of a particular hosted Internet service product to connect to the domain includes at least one hosted Internet service product that is already connected to the domain and omitting prompting any hosted Internet service product categories to which the selection of a particular hosted Internet service product, already connected to the domain, belongs.

8. The method of claim 1, wherein the starting point selected is a hosted Internet service product, the prompting for and receiving the selection of at least one other hosted Internet service product further including, determining whether the selection of at least one other hosted Internet service product belonging to a hosted Internet service product category to connect to the domain includes at least one hosted Internet service product that is already connected to the domain and omitting prompting any hosted Internet service product categories to which the selection of at least one hosted Internet service product, already connected to the domain, belongs.

9. The method of claim 1, wherein the plurality of hosted Internet service product categories include a hosting service product category, email service product category, security service product category, communications service product category and cloud-based storage service product category.

10. The method of claim 9, wherein the hosting service product category includes at least one of a Shared Hosting, Virtual Private Server (or VPS), Dedicated Servers, App-based hosting services.

11. The method of claim 10, wherein the App-based hosting services are provided for hosting products including at least one of a WordPress™ product and a Drupal™ product.

12. The method of claim 9, wherein the email service product category includes at least one of a cloud-based email product, a web-based email product and an endpoint to endpoint encrypted email product.

13. The method of claim 9, wherein the security service product category includes at least a secured socket layer (SSL) product having data that defines connection of the SSL product to the domain.

14. The method of claim 9, wherein the communications service product category includes at least a voice communication product, a data communication product and a video communication product wherein the voice communication product, the data communication product and the video communication product establish link to the domain using proprietary domain name server records including the domain as an identifier.

15. The method of claim 1, further including, dynamically building a library of hosted Internet service product categories wherein a product category comprises a set of products, and wherein the library of hosted Internet service product categories is dynamically created during digitally unpackaging and auto-installing one or more products from a set of available products based on a prior selection of at least one hosted Internet service product selected from (i) the domain and (ii) the hosted Internet service product.

16. The method of claim 15, wherein the library of hosted Internet service product categories includes two or more hosted Internet service products belonging to a single product category, further including: blocking more than one of the two or more hosted Internet service products to be included in the set of hosted Internet service products wherein the single product category does not allow selection of products from a same product category.

17. The method of claim 16, wherein the blocking more than one of the two or more hosted Internet service products to be included in the set of products further includes permitting only one hosted Internet service product from the respective hosted Internet service product category to be selected.

18. The method of claim 15, wherein hosted Internet service products of different hosted Internet service product categories are packaged together in packages and entered into the library, further including:
    for a domain, upon receiving selection of a hosted Internet service product in the package, including other hosted Internet service products in the package into the set of products for the domain.

19. A server system including a hardware processor and memory storing machine instructions that implement a method for digitally unpackaging and auto-installing one or more hosted Internet service products from a set of available hosted Internet service products, which instructions, when executed by the hardware processor, implement actions comprising:
    receiving a selection of a starting point and determining whether the selected starting point is one selected from (i) a domain and (ii) a hosted Internet service product,
    if the starting point selected is a domain, then:
    for the domain, prompting for and receiving a selection of at least one hosted Internet service product category in a plurality of hosted Internet service product categories;
        for each hosted Internet service product category in the selection of the at least one hosted Internet service product category, prompting to receive a selection of a particular hosted Internet service product to connect to the domain until a set of hosted Internet service products is received;
    otherwise, if the starting point selected is a hosted Internet service product, then:
        for the hosted Internet service product, prompting for and receiving at least one domain to connect to the hosted Internet service product;
        for the hosted Internet service product and each domain, prompting for and receiving a selection of at least one other hosted Internet service product belonging to a hosted Internet service product category to connect to the domain from a set of hosted Internet service product categories;
    setting up connections between hosted Internet service products selected and configuring the hosted Internet service products selected; and
providing the hosted Internet service products selected as configured to an installation process.

20. A non-transitory computer readable medium storing machine-readable instructions, that when executed by a hardware processor implement actions comprising:
    receiving a selection of a starting point and determining whether the starting point selected is one selected from (i) a domain and (ii) a hosted Internet service product,
    if the starting point selected is a domain, then:
    for the domain, prompting for and receiving a selection of at least one hosted Internet service product category in a plurality of hosted Internet service product categories;
        for each hosted Internet service product category in the selection of the at least one hosted Internet service product category, prompting to receive a selection of a particular hosted Internet service product to connect to the domain until a set of hosted Internet service products is received;
    otherwise, if the starting point selected is a hosted Internet service product, then:

for the hosted Internet service product, prompting for and receiving at least one domain to connect to the hosted Internet service product;

for the hosted Internet service product and each domain, prompting for and receiving a selection of at least one other hosted Internet service product belonging to a hosted Internet service product category to connect to the domain from a set of hosted Internet service product categories;

setting up connections between hosted Internet service products selected and configuring the hosted Internet service products selected; and providing the hosted Internet service products selected as configured to an installation process.

* * * * *